(12) United States Patent
Shimotani et al.

(10) Patent No.: US 8,963,849 B2
(45) Date of Patent: Feb. 24, 2015

(54) DISPLAY INPUT DEVICE

(75) Inventors: Mitsuo Shimotani, Tokyo (JP); Tsutomu Matsubara, Tokyo (JP); Takashi Sadahiro, Tokyo (JP); Masako Ohta, Tokyo (JP); Yuichi Okano, Tokyo (JP); Tsuyoshi Sempuku, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 832 days.

(21) Appl. No.: 13/062,713

(22) PCT Filed: Nov. 26, 2009

(86) PCT No.: PCT/JP2009/006390
§ 371 (c)(1),
(2), (4) Date: Mar. 8, 2011

(87) PCT Pub. No.: WO2010/064387
PCT Pub. Date: Jun. 10, 2010

(65) Prior Publication Data
US 2011/0164063 A1    Jul. 7, 2011

(30) Foreign Application Priority Data
Dec. 4, 2008    (JP) .................................. 2008-309799

(51) Int. Cl.
*G09G 5/00*     (2006.01)
*G06F 3/0488*   (2013.01)
*G06F 3/041*    (2006.01)

(52) U.S. Cl.
CPC .......... *G06F 3/04886* (2013.01); *G06F 3/0416* (2013.01); *G06F 3/0488* (2013.01)
USPC ........................................ 345/173; 178/18.01

(58) Field of Classification Search
USPC ......... 715/769; 345/173, 661, 676; 178/18.01
See application file for complete search history.

(56) References Cited

U.S. PATENT DOCUMENTS

| 4,942,514 | A | 7/1990 | Miyagaki et al. | |
|---|---|---|---|---|
| 7,663,611 | B2 * | 2/2010 | Fagard | 345/174 |
| 8,219,936 | B2 * | 7/2012 | Kim et al. | 715/862 |
| 8,584,043 | B2 * | 11/2013 | Cho et al. | 715/838 |
| 2002/0196238 | A1 | 12/2002 | Tsukada et al. | |
| 2005/0253807 | A1 | 11/2005 | Hohmann et al. | |
| 2008/0192024 | A1 | 8/2008 | Mita | |
| 2009/0289903 | A1 * | 11/2009 | Chen et al. | 345/173 |

FOREIGN PATENT DOCUMENTS

CN    1855021 A    11/2006
(Continued)

*Primary Examiner* — Abbas Abdulselam
(74) *Attorney, Agent, or Firm* — Birch, Stewart, Kolasch & Birch, LLP

(57) ABSTRACT

A display input device is comprised of a touch panel 1 for carrying out a display of information and an input of information, a proximity sensor 12 for detecting a movement of an object to be detected which is positioned opposite to the touch panel 1 in a noncontact manner, and a control unit 3 for, when the proximity sensor 12 detects an approach of the object to be detected to within a predetermined distance from the touch panel 1, moving a specific display object displayed on the touch panel 1 close to a stop position of the object to be detected to display the specific display object.

11 Claims, 14 Drawing Sheets

(56) References Cited

FOREIGN PATENT DOCUMENTS

| JP | 1-209520 A | 8/1989 |
| JP | 4-128877 A | 4/1992 |
| JP | 2003-5912 A | 1/2003 |
| JP | 2005-327262 A | 11/2005 |
| JP | 2006-31499 A | 2/2006 |
| JP | 2008-114772 A | 5/2008 |
| JP | 2008-129689 A | 6/2008 |
| JP | 2008-197934 A | 8/2008 |

* cited by examiner

FIG.5
(a)
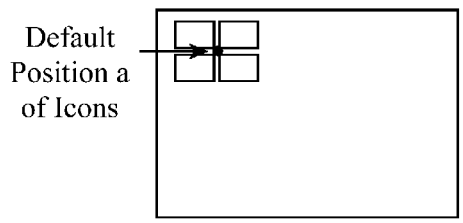
Default Position a of Icons
(b)
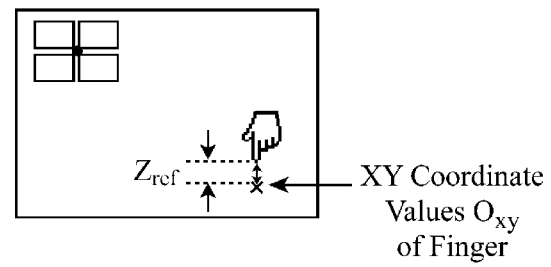
$Z_{ref}$
XY Coordinate Values $O_{xy}$ of Finger
(c)
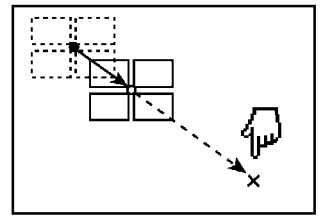
(d)
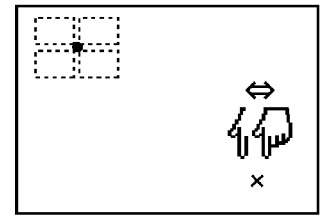
(e)
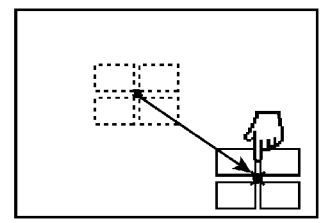
(f)
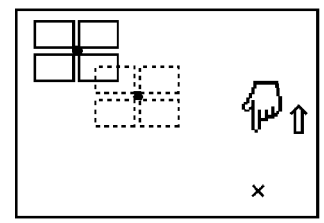

FIG.10
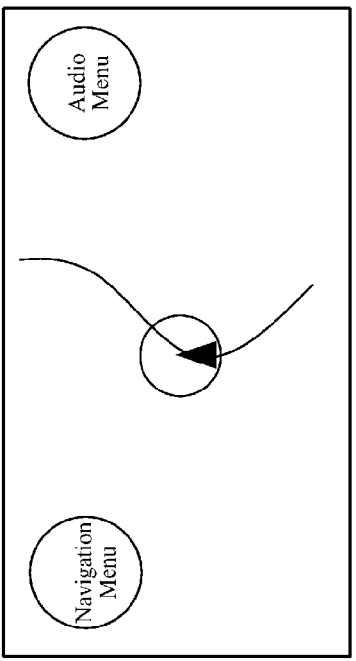
(b)
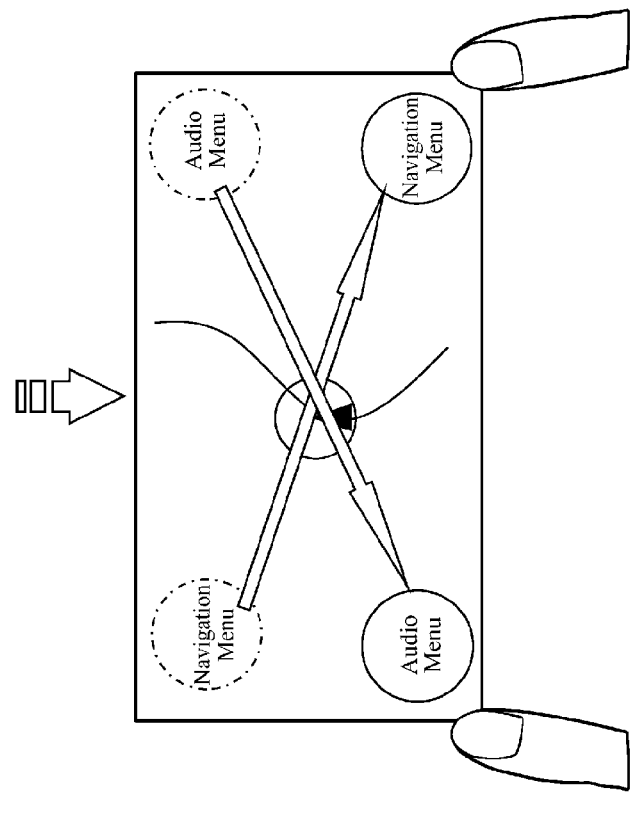
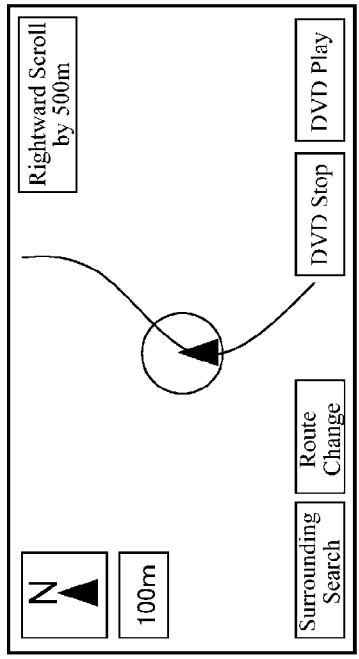
(a)
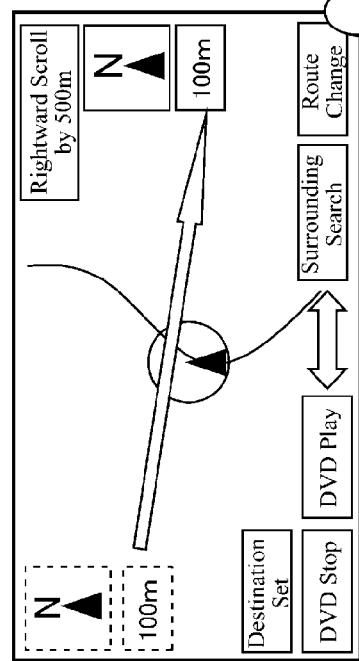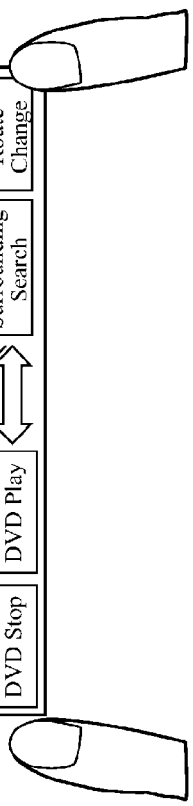

FIG.15
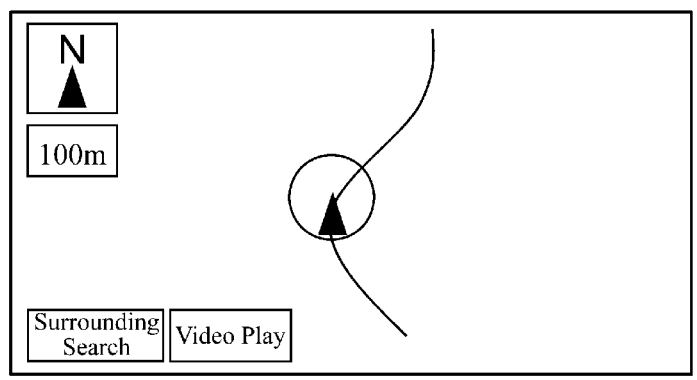
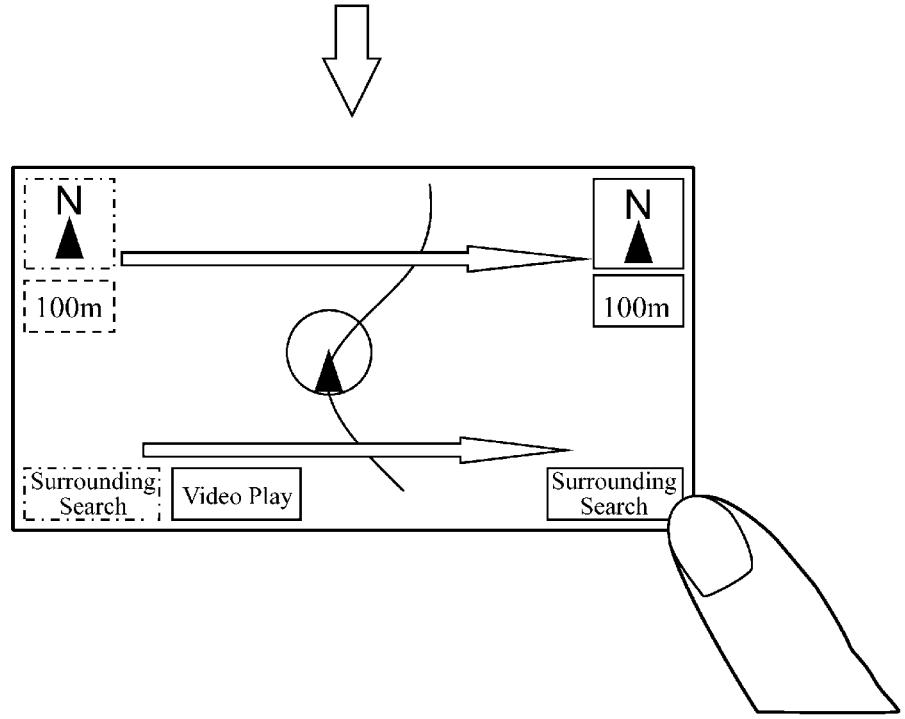

DISPLAY INPUT DEVICE

FIELD OF THE INVENTION

The present invention relates to a display input device which is particularly suitable for use in vehicle-mounted information equipment such as a navigation system.

BACKGROUND OF THE INVENTION

A touch panel is an electronic part which is constructed of a matrix-shaped touch sensor laminated on an LCD (liquid crystal display) panel, for example, and is a display input device that can allow a user to touch an input button display area, such as an icon displayed on the LCD panel, by using an object to be detected, such as a finger or a pen, and detect information about the coordinate position of a part on the screen which has been touched by the user to enable the user to operate target equipment. Therefore, in many cases, a touch panel is used while being incorporated into equipment, such a vehicle-mounted navigation system or a bank ATM (Automatic Teller Machine), which has to meet the need for the user to handle the equipment by following a self-explanatory procedure.

Many proposals for improving the operability and user-friendliness of a touch panel as mentioned above have been applied for patent.

For example, a display input device which, when a user brings his or her finger close to the device, enlarges and displays a key switch which is positioned in the vicinity of the finger so as to facilitate the user's selection operation (for example, refer to patent reference 1), a CRT device which detects a vertical distance of a finger and displays information with a scale of enlargement according to the distance (for example, refer to patent reference 2), an input unit equipped with a touch panel which detects whether or not a user's hand is in contact with an arm switch and changes an arrangement of icons when detecting that the user's hand is in contact with the arm switch (for example, refer to patent reference 3), and so on have been known.

RELATED ART DOCUMENT

Patent Reference

Patent reference 1: JP,2006-31499,A
Patent reference 2: JP,04-128877,A
Patent reference 3: JP,2008-129689,A

SUMMARY OF THE INVENTION

According to the technology disclosed by above-mentioned patent reference 1, because when a user brings his or her finger close to the touch panel, an enlarged display of an icon positioned in the vicinity of the position where the user's finger is close to the touch panel is produced, operation mistakes can be prevented and the user is enabled to easily perform an operation of selecting the icon. However, because the icon positioned in the vicinity of the position where the user's finger is close to the touch panel is simply enlarged and displayed on the screen, the user needs to move his or her finger in many directions to perform an operation on vehicle-mounted information equipment in which icons are distributedly arranged on the screen, and such a movement is not preferable for safe driving. Furthermore, a new user interface using the three-dimensional touch panel disclosed by patent reference 2 has not been provided yet.

Furthermore, according to the technology disclosed by patent reference 3, because an icon is brought closer to a predetermined position and is displayed at the position as compared with a case in which the user's hand is not detected, the input operation is facilitated and the operability of the equipment is improved. However, in this case, because the display position at which the icon is displayed is dependent upon the mounting position of the arm switch, and a touch of the user's hand on the arm switch is needed to change the arrangement of icons displayed on the screen, the operability of the equipment may be impaired conversely.

The present invention is made in order to solve the above-mentioned problems, and it is therefore an object of the present invention to provide a display input device that obtains a great improvement in its operability.

In order to solve the above-mentioned problems, in accordance with the present invention, there is provided a display input device including: a touch panel for carrying out a display of information and an input of information; a proximity sensor for detecting a movement of an object to be detected which is positioned opposite to the above-mentioned touch panel in a noncontact manner; and a control unit for, when the above-mentioned proximity sensor detects an approach of the above-mentioned object to be detected to within a predetermined distance from the above-mentioned touch panel, moving a specific display object displayed on the above-mentioned touch panel close to a stop position of the above-mentioned object to be detected to display the above-mentioned specific display object.

In accordance with the present invention, the display input device can achieve a further improvement in operability.

BRIEF DESCRIPTION OF THE FIGURES

FIG. 5 is a screen transition figure schematically showing the operation of the display input device in accordance with Embodiment 1 of the present invention on a touch panel;

FIG. 10 is an operation conceptual diagram schematically showing the operation of a display input device in accordance with Embodiment 4 of the present invention on a touch panel;

FIG. 15 is an operation conceptual diagram schematically showing the operation of the display input device in accordance with Embodiment 6 of the present invention on a touch panel.

EMBODIMENTS OF THE INVENTION

Hereafter, in order to explain this invention in greater detail, the preferred embodiments of the present invention will be described with reference to the accompanying drawings.

Embodiment 1.

Figure 1:
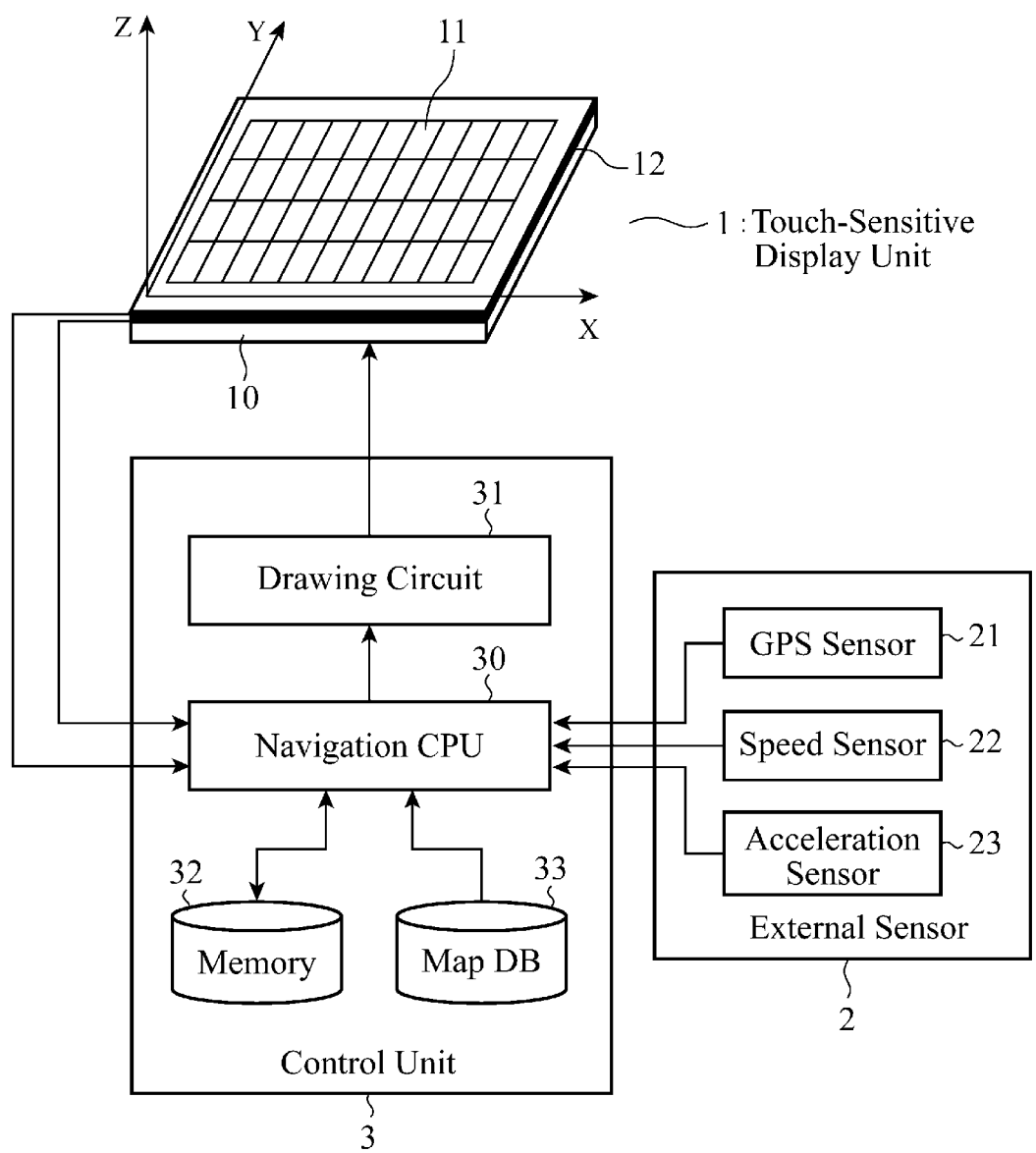
FIG. 1 is a block diagram showing the internal structure of a display input device in accordance with Embodiment 1 of the present invention.

FIG. 1 is a block diagram showing the structure of a display input device in accordance with Embodiment 1 of the present invention. As shown in FIG. 1, the display input device in accordance with Embodiment 1 of the present invention is comprised of a touch-sensitive display unit (abbreviated as a touch panel from here on) 1, external sensors 2, and a control unit 3.

The touch panel 1 carries out a display of information and an input of the information. For example, the touch panel 1 is constructed in such a way that a touch sensor 11 for inputting information is laminated on an LCD panel 10 for displaying information. In this embodiment, the touch panel 1 and a plurality of proximity sensors 12 each of which carries out non-contact detection in two dimensions of a movement of an object to be detected, such as a finger or a pen, which is positioned opposite to the touch panel 1 are mounted on a peripheral portion outside the touch sensor 11.

In a case in which each of the proximity sensors 12 uses an infrared ray as a detection medium, infrared ray emission LEDs (Light Emitted Diodes) and light receiving transistors are arranged opposite to each other on the peripheral portion outside the touch sensor 11 in the form of an array. Each of the proximity sensors 12 detects a block of light emitted therefrom or reflected light which is caused by an approach of an object to be detected to detect the approach and also detects the coordinate position of the object.

The proximity sensors 12 are not limited to the above-mentioned sensors which employ infrared rays as their detection media. For example, sensors of capacity type each of which detects an approach of an object to be detected from a change of its capacitance which occurs between the object to be detected and two plates arranged in parallel like a capacitor can be alternatively used. In this case, one of the two plates serves as a ground plane oriented toward the object to be detected, and the other plate serves as a sensor detection plane, and each of the sensors of capacity type can detect an approach of the object to be detected from a change of its capacitance formed between the two plates and can also detect the coordinate position of the object.

On the other hand, the external sensors 2 can be mounted at any positions in a vehicle, and include at least a GPS (Global Positioning System) sensor 21, a speed sensor 22, and an acceleration sensor 23.

The GPS sensor 21 receives radio waves from GPS satellites, creates a signal for enabling the control unit 3 to measure the latitude and longitude of the vehicle, and outputs the signal to the control unit 3. The speed sensor 22 measures vehicle speed pulses for determining whether or not the vehicle is running and outputs the vehicle speed pulses to the control unit 3, for example. The acceleration sensor 23 measures a displacement of a weight attached to a spring to estimate an acceleration applied to the weight, for example. In a case in which the acceleration sensor 23 is a three-axis one, the acceleration sensor follows an acceleration variation ranging from 0 Hz (only the gravitational acceleration) to several 100 Hz, for example, and measures the direction (attitude) of the weight with respect to the ground surface from the sum total of acceleration vectors in X and Y directions and informs the direction to the control unit 3.

The control unit 3 has a function of, when the proximity sensors 12 detect an approach of an object to be detected to within a predetermined distance from the touch panel 1, moving a display object displayed on the touch panel 1, such as an icon or specific image information, by using a method, such as a smoothly scrolling method, close to a stop position of the object to be detected, to display the display object in the vicinity of the position. To this end, the control unit 3 is comprised of a CPU (referred to as a navigation CPU 30) mainly aimed at providing navigation, a drawing circuit 31, a memory 32, and a map DB (Data Base) 33.

The navigation CPU 30 carries out a navigation process of, when a navigation menu, such as a destination guidance menu, which is displayed on the touch panel 1 is selected by a user, providing navigation following the menu. When carrying out the navigation process, the navigation CPU 30 refers to map information stored in the map DB 33, and carries out a route search, the above-mentioned destination guidance or the like according to various sensor signals acquired from the external sensors 2.

Figure 2:
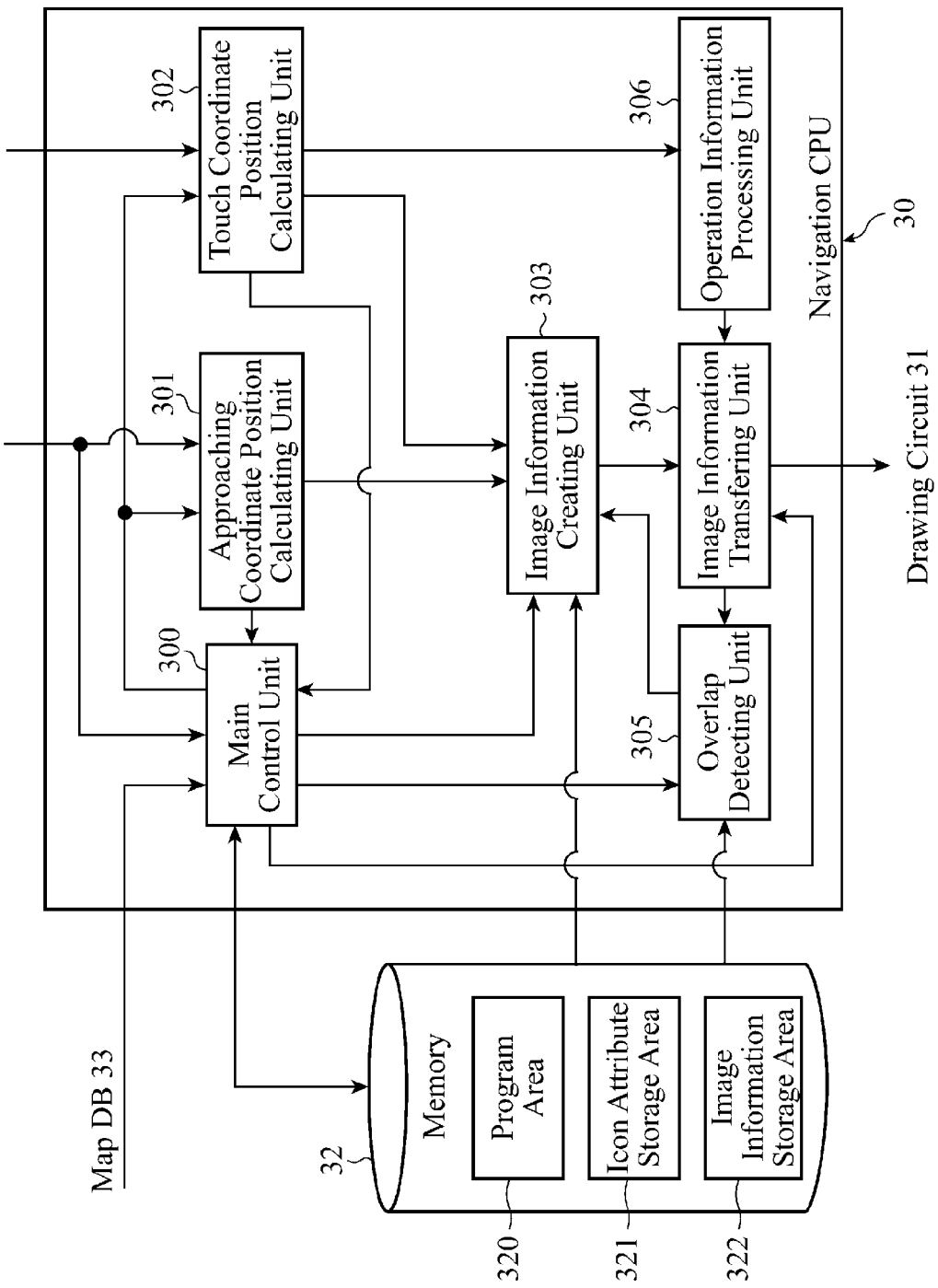
FIG. 2 is a block diagram showing a functional development of the program structure of a navigation CPU which the display input device in accordance with Embodiment 1 of the present invention has.

Furthermore, when the proximity sensors 12 detect an approach of an object to be detected to within the predetermined distance from the touch panel 1, in order to implement the function, as the control unit 3, of moving at least one of pieces of information in one or more display areas each having a fixed range which are displayed on the touch panel 1 close to the stop position of the object to be detected to display the one or more pieces of information in the vicinity of the position, the navigation CPU 30 creates image information according to a program stored in the memory 32 to control the drawing circuit 31. The structure of the program which the navigation CPU 30 executes in that case is shown in FIG. 2, and the details of the structure will be mentioned below.

Figure 3:
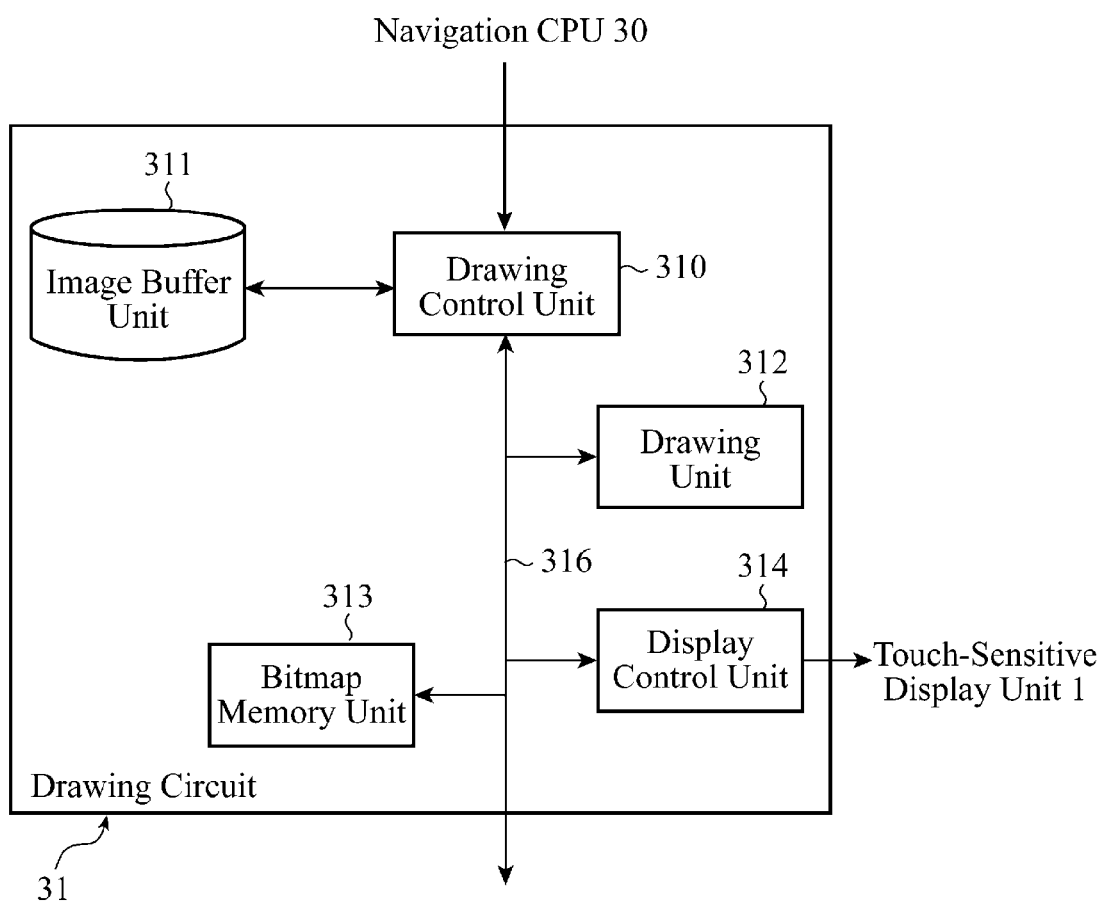
FIG. 3 is a block diagram showing the internal structure of a drawing circuit which the display input device in accordance with Embodiment 1 of the present invention has.

The drawing circuit 31 expands the image information created by the navigation CPU 30 on a bit map memory built therein or mounted outside the drawing circuit at a fixed speed, reads image information which is expanded on the bit map memory by a display control unit similarly built therein in synchronization with the display timing of the touch panel 1 (the LCD panel 10), and displays the image information on the touch panel 1. The above-mentioned bit map memory and the above-mentioned display control unit are shown in FIG. 3, and the details of these components will be mentioned below.

An icon attribute storage area, an image information storage area, and so on are assigned to a work area of the memory 32, which is provided in addition to a program area in which the above-mentioned program is stored, and icon attributes and image information are stored in the memory 32.

In this case, an "icon attribute" is information which is defined for each icon, and which includes a default display position and a flag showing whether or not the above-mentioned movement and display is possible. In addition, when the display input device is applied as vehicle-mounted man-machine equipment, information showing whether each icon is used by either a passenger on the driver's seat or a passenger on the front seat can also be added as an attribute. The details of icon attributes will be mentioned below. Furthermore, maps, facility information and so on required for navigation including a route search and guidance are stored in the map DB 33.

FIG. 2 is a block diagram showing a functional development of the structure of the program which the navigation CPU 30 of FIG. 1, which the display input device (the control unit 3) in accordance with Embodiment 1 of the present invention has, executes.

As shown in FIG. 2, the navigation CPU 30 includes a main control unit 300, an approaching coordinate position calculating unit 301, a touch coordinate position calculating unit 302, an image information creating unit 303, an image information transferring unit 304, an overlap detecting unit 305, and an operation information processing unit 306.

The approaching coordinate position calculating unit 301 has a function of, when the proximity sensors 12 detect an approach of an object to be detected, calculating the XY coordinate position of the object and delivering the XY coordinate position to the main control unit 300.

The touch coordinate position calculating unit 302 has a function of, when the touch sensor 11 detects a touch of an object to be detected on the touch panel 1, calculating the XY coordinate position of the touch and delivering the XY coordinate position to the main control unit 300.

The image information creating unit 303 has a function of creating image information including an icon to be displayed on the touch panel 1 under the control of the main control unit 300, and outputting the image information to the image information transferring unit 304.

In this case, when moving information about one or more display areas each having a fixed range, such as an icon displayed on the touch panel 1, close to the stop position of the object to be detected, such as a finger or a pen, to display the information in the vicinity of the position, the navigation CPU 30 uses a method of "screen switching" or "smoothly scrolling". The "screen switching" means that the image information creating unit 303 instantaneously updates the image information to be displayed within a non-display period of the touch panel 1 (the LCD panel 10) to write the image information updated thereby in the image information storage area 322 of the memory 32, and the image information transferring unit 304 transfers the image information updated instantaneously to the drawing circuit 31 during the next display period to carry out the movement and display in an instant. The "smoothly scrolling" means that the image information creating unit 303 repeats an update of the image information on a bit-by-bit basis during each non-display period of the touch panel 1 (the LCD panel 10), and the image information transferring unit 304 transfers the image information updated during each non-display period to the drawing circuit 31 during each display period to carry out the movement and display smoothly. Either of "screen switching" and "smoothly scrolling" can have various methods each of which is implemented via H/W or S/W, and both of them are not limited to the above-mentioned methods.

Furthermore, under the control of the main control unit 300, the image information creating unit 303 can also carry-out a process of enlarging the information about the one or more display areas each having a fixed range, such as an icon, which are to be moved close to the stop position of the object to be detected, such as a finger or a pen, and displayed in the vicinity of the position, according to the distance between the object to be detected which has got close to the touch panel 1, and the touch panel 1.

In this case, the "enlarging process" means that the image information creating unit 303 reads an already-created bitmap image, such as a bitmapped image of an icon, at a fixed rate, and interpolates intermediate pixels to draw an image into a new bitmap. For example, the image information creating unit 303 can implement the enlarging process by copying the value of each pixel of the original bitmap image to each of the four values of an array of two rows and two columns when enlarging the original bitmap image to twice of its original size. In contrast with this, when reducing the original bitmap image, the image information creating unit can implement this reducing process by thinning out the pixels of the original bitmap image at a fixed ratio. Although the method of enlarging or reducing the original bitmap image is explained as an example, in a case of processing a vector image instead of a bit image, the vector image can be enlarged or reduced to a more beautiful image through a predetermined enlarging and reducing computation.

The image information transferring unit 304 has a function of transferring the image information created by the image information creating unit 303 to the drawing circuit 31 under the timing control of the main control unit 300.

The overlap detecting unit 305 has a function of, when moving a plurality of icons close to the stop position of the object to be detected, such as a finger or a pen, to display the plurality of icons in the vicinity of the position, detecting an overlap which can occur among the icon display positions where the plurality of icons are displayed. In this case, when the overlap detecting unit detects an overlap among the icon display positions, the image information creating unit 303 creates image information including the icons which are rearranged in such a way that no overlap occurs among their icon display positions, and transfers the image information to the image information storage area 322 of the memory 32. In this case, the detection of an overlap among the icon display positions and the rearrangement of the icons can be implemented by calculating and comparing the display address of each of the icons after the movement and display has been carried out on the basis of a default display position defined by an icon attribute of each of the icons which is assigned to and stored in a predetermined area of the memory 32.

The operation information processing unit 306 has a function of creating operation information defined for an icon which is based on the coordinate position of the touch calculated by the touch coordinate position calculating unit 302, outputting the operation information to the image information transferring unit 304, and then displaying the operation information on the touch panel 1 (the LCD monitor 10) under the control of the main control unit 300. For example, when the touched icon is a key of a soft keyboard, the operation information processing unit 306 creates image information based on the touched key, outputs the image information to the image information transferring unit 304, and then displays the image information on the touch panel 1. When the touched icon is an icon button, the operation information processing unit 306 carries out a navigation process defined for the icon button, such as a destination search, creates image information, outputs the image information to the image information transferring unit 304, and then displays the image information on the touch panel 1.

The work area having a predetermined amount of storage, in addition to the program area 320 in which the above-mentioned program is stored is assigned to the memory 32. In this work area, the icon attribute storage area 321 in which the above-mentioned icon attributes are defined and stored, and the image information storage area 322 in which the image information created by the image information creating unit 303 is stored temporarily are included.

FIG. 3 is a block diagram showing the internal structure of the drawing circuit 31 shown in FIG. 1. As shown in FIG. 3, the drawing circuit 31 is comprised of a drawing control unit 310, an image buffer unit 311, a drawing unit 312, the bitmap memory unit 313, and the display control unit 314. They are commonly connected to one another via a local bus 316 which consists of a plurality of lines used for address, data and control.

In the above-mentioned construction, the image information transferred from the navigation CPU 30 shown in FIG. 2 (the image information transferring unit 304) is held by the image buffer unit 311 under the control of the drawing control unit 310, and the drawing control unit 310 decodes a command such as a straight line drawing command or a rectangle drawing command, or carries out preprocessing about the slope of a line or the like prior to a drawing process. The drawing unit 312, which is started by the drawing control unit 310, then carries out high-speed drawing of the image information decoded by the drawing control unit 310 into the bitmap memory unit 313, and the display control unit 314 reads and displays the image information held by the bitmap memory unit 313 in synchronization with the display timing of the LCD panel 10 of the touch panel 1.

Figure 4:
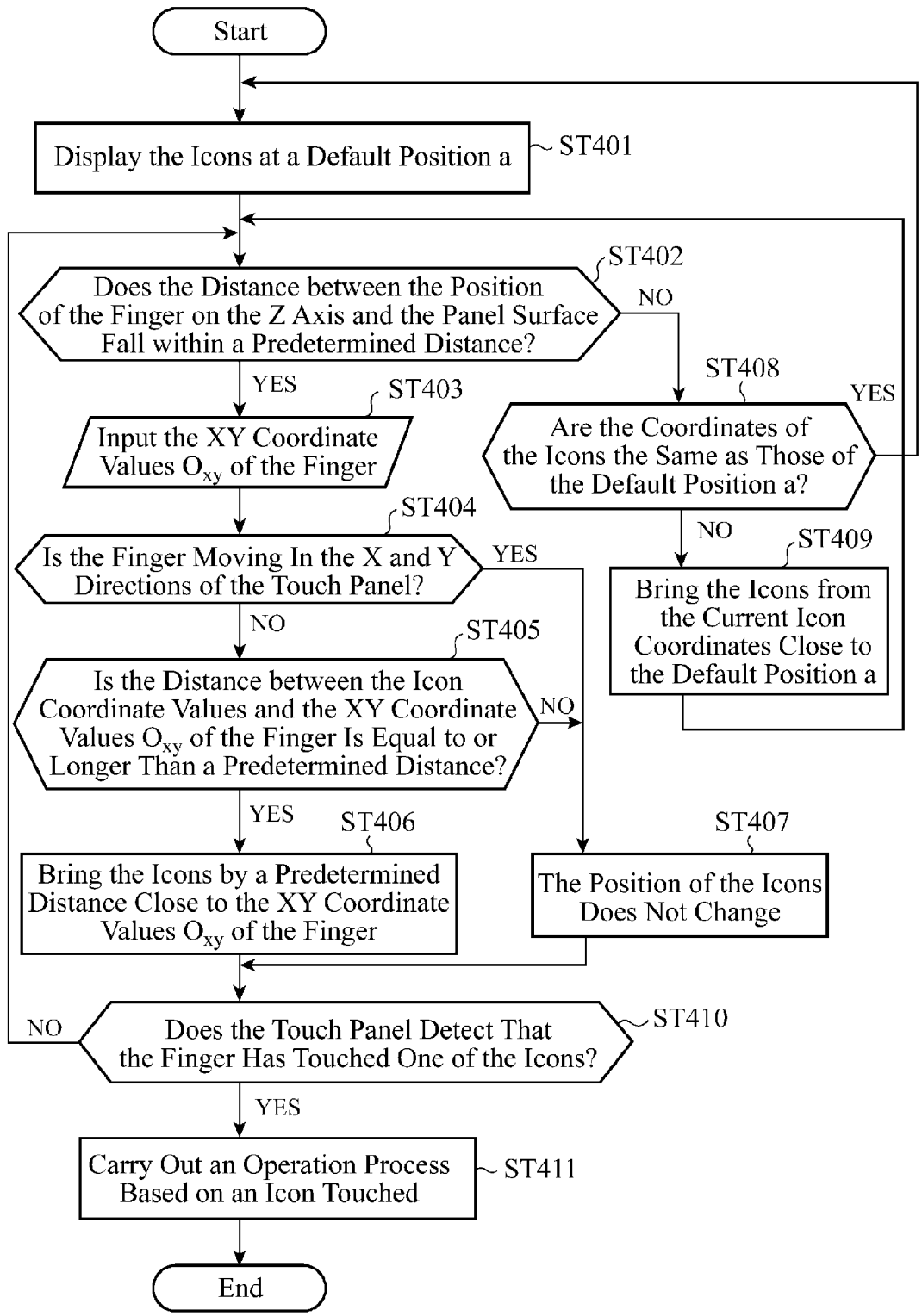
FIG. 4 is a flow chart showing the operation of the display input device in accordance with Embodiment 1 of the present invention.

FIG. 4 is a flow chart showing the operation of the display input device in accordance with Embodiment 1 of the present invention. Furthermore, FIG. 5 is a screen transition figure schematically showing movements of an icon group, which is information about one or more display areas each having a fixed range, and a finger which is an object to be detected at that time on the touch panel 1.

Hereafter, the operation of the display input device in accordance with Embodiment 1 of the present invention shown in FIGS. 1 to 3 will be explained in detail with reference to FIGS. 4 and 5.

As shown in FIG. 5(*a*), it is assumed that the icon group is displayed at a default position a on the touch panel 1 (the LCD panel 10) at first (step ST401 of FIG. 4).

When the user brings his or her finger close to the touch panel 1 to operate the touch panel 1, the proximity sensors 12 detect this approach and transmit an approaching signal to the navigation CPU 30. At this time, the main control unit 300 of the navigation CPU 30 determines whether the distance between the position of the finger on the Z axis and the panel surface of the touch panel 1 falls within a predetermined distance (step ST402). In this case, the predetermined value is defined as Zref shown in FIG. 5(*b*).

At that time, when it is detected that the distance between the finger and the panel surface is equal to or shorter than the predetermined distance (if "YES" in step ST402), the approaching coordinate position calculating unit 301 calculates the XY coordinate values $O_{xy}$ of the finger, and inputs the XY coordinate values $O_{xy}$ of the finger to the main control unit 300 every 0.01 second only during 0.1 seconds, for example (step ST403).

The main control unit 300 can determine whether the finger is moving or at rest by receiving the inputted XY coordinate values $O_{xy}$ of the finger continuously during 0.1 seconds. More specifically, when there is no change in the XY coordinate values $O_{xy}$ of the finger during 0.1 seconds, that is, when determining that the finger is not moving in the X and Y directions of the touch panel 1 (if "NO" in step ST404), the main control unit 300 determines whether or not the distance between the icon display position and the XY coordinate values $O_{xy}$ of the finger is equal to or longer than a predetermined distance (step ST405), and, when the distance is equal to or longer than the predetermined distance (if "YES" in step ST405), the main control unit 300 starts a process of creating image information (a scroll image) by using the image information creating unit 303. For the convenience of this explanation, although it is described that the main control unit 300 determines whether or not the finger is moving during 0.1 seconds, the main control unit 300 can keep a history of some continuously-performed determinations of whether or not the finger is moving during 0.1 seconds and determine whether or not the finger is moving from the several pieces of information each about the determination during a time period of 0.1 seconds. In this case, when the finger is trembling slightly, the main control unit can determine that there is no change in the above-mentioned XY coordinate values $O_{xy}$, and the accuracy of the determination can be improved.

More specifically, the image information creating unit 303 creates image information in such a way that the icon display position is placed close to the XY coordinate values $O_{xy}$ of the finger. The image information created at this time is written in the image information storage area 322 of the memory 32, and is updated as occasion demands according to the scroll rate and is also outputted to the image information transferring unit 304.

The image information transferring unit 304 receives the image information created by the image information creating unit 303 and transfers this image information to the drawing circuit 31. The drawing control unit 310 of the drawing circuit 31 expands the image information transferred to the drawing circuit, and the drawing unit 312 draws the expanded image information into the bitmap memory unit 313 at a high speed. The display control unit 314 then performs a desired scroll display process on the touch panel 1. More specifically, the display control unit 314 carries out a smoothly scrolling display process of gradually moving the icons toward the XY coordinate values $O_{xy}$ of the finger on the touch panel 1 to bring them close to the XY coordinate values (step ST406). An example of the screen transition at this time is shown in FIG. 5(*c*).

When it is determined in the process in step ST404 of determining whether or not the finger is moving in the X and Y directions that the finger is moving (if "YES" in step ST404), or when it is determined in the process in step ST405 of determining whether the distance between the icon display position and the XY coordinate values $O_{xy}$ of the finger is equal to or longer than the predetermined distance that the distance is neither equal to nor longer than the predetermined distance (if "NO" in step ST405), the display control unit can understand that there is no change in the display position of the icons (step ST407). An example of the screen transition at this time is shown in FIG. 5(*d*).

When it is determined in step ST402 that the distance between the finger and the touch panel face falls within the predetermined range (if "YES" in step ST402), the main control unit 300 repeatedly carries out the above-mentioned processes of steps ST402 to ST407 until the touch panel 1 detects that the finger has touched one of the icons (if "YES" in step ST410).

As a result, as shown in an example of the screen transition of FIG. 5(e), a scroll display is produced in such a way that the icon display position gets closer and closer to the XY coordinate values $O_{xy}$ of the finger of the touch panel 1.

When the touch panel 1 (the touch sensor 11) detects that the finger has touched one of the icons (if "YES" in step ST410), the touch coordinate position calculating unit 302 calculates the coordinate position of the touch and starts the operation information processing unit 306. The operation information processing unit 306 then carries out an operation process based on the key corresponding to the coordinates of the touch calculated by the touch coordinate position calculating unit 302 (step ST411). In this case, the operation process based on the key corresponding to the coordinates of the touch means that, in the case in which the touched icon is a key of the soft keyboard, the operation information processing unit creates image information based on the touched key, outputs the image information to the image information transferring unit 304, and displays the image information on the touch panel 1 (the LCD monitor 10). In the case in which the touched icon is an icon button, the operation information processing unit carries out a navigation process defined for the icon button, such as a destination search, creates image information, outputs the image information to the image information transferring unit 304, and then displays the image information on the touch panel 1 (the LCD monitor 10).

In contrast, when it is detected in step ST402 that the distance between the finger and the panel surface is equal to or longer than the predetermined distance (if "NO" in step ST402), the main control unit 300 performs a comparison between the display position of the icons currently being displayed and the default coordinate position a of the icons (step ST408). At this time, when determining that the display position of the icons currently being displayed differs from the default coordinate position a (if "NO" in step ST408), that is, when the icons have moved from the default position on the screen of the touch panel 1, the main control unit 300 controls the image information creating unit 303 to cause the image information creating unit 303 to create image information in such a way as to bring the icons close to the default display position a. The image information created is stored in the image information storage area 322 of the memory 32 and is outputted to the image information transferring unit 304 as occasion demands.

The image information transferring unit 304 receives the image information and transfers this image information to the drawing circuit 31, and the drawing control unit 310 of the drawing circuit 31 expands the image information transferred thereto, and the drawing unit 312 draws the expanded image information into the bitmap memory unit 313 at a high speed.

The display control unit 314 then produces a desired display on the touch panel 1 (the LCD panel 10). More specifically, the display control unit 314 carries out a smoothly scrolling display process of bringing the icons from the current display position at which they are positioned near the stop position of the finger close to the default display position a (step ST409). An example of the screen transition at this time is shown in FIG. 5(f).

When it is determined in step ST402 that the distance between the position on the Z axis of the finger and the touch panel face is equal to or longer than the predetermined distance (if "NO" in step ST402), the main control unit 300 repeatedly carries out the icon coordinate determining process in step ST408 and the smoothly scrolling display process in ST409 of moving the icons to the default position a until the icons are returned to the default position a.

In the above-mentioned display input device in accordance with Embodiment 1 of the present invention, when a finger's approach to within a predetermined distance from the touch panel 1 is detected by the proximity sensors 12, the control unit 3 (the navigation CPU 30) moves at least one of the icons displayed on the touch panel 1 close to the stop position of the finger and display at least the icon in the vicinity of the position, thereby being able to provide a new user interface. Particularly, when the display input device in accordance with Embodiment 1 of the present invention is used for vehicle-mounted information equipment that carries out navigation etc., the user-friendliness of the vehicle-mounted information equipment can be improved and a further improvement can be provided in the operability of the vehicle-mounted information equipment.

In the display input device in accordance with Embodiment 1 of the present invention, the smoothly scrolling method of moving one or more icons close to the coordinate position of the finger at a constant speed in order to implement the movement and display is explained above. Instead of using the smoothly scrolling method, the movement and display can be implemented by using a method of moving the one or more icons in an instant.

In this case, the navigation CPU 30 (the image information creating unit 303) needs to create an image to which the image displayed on the touch panel 1 (the LCD panel 10) is to be switched and in which the one or more icons have been moved in order to change the currently-displayed image in an instant, and update the currently-displayed image into the created image. As a result, the load on the navigation CPU 30 can be reduced.

Furthermore, in the display input device in accordance with Embodiment 1 of the present invention, a plurality of icons are gathered at the stop position of the finger and displayed, as previously explained as an example. As an alternative, any icon which is not affected by the finger's approach can be excluded from the target of the movement and display process, or some icons which are not affected by the finger's approach can be set in such a way to go away from the stop position of the finger as the finger approaches the touch panel. This variant can be implemented by rewriting the icon attributes of such icons which are defined in the icon attribute storage area 321 of the memory 32.

Figure 6:
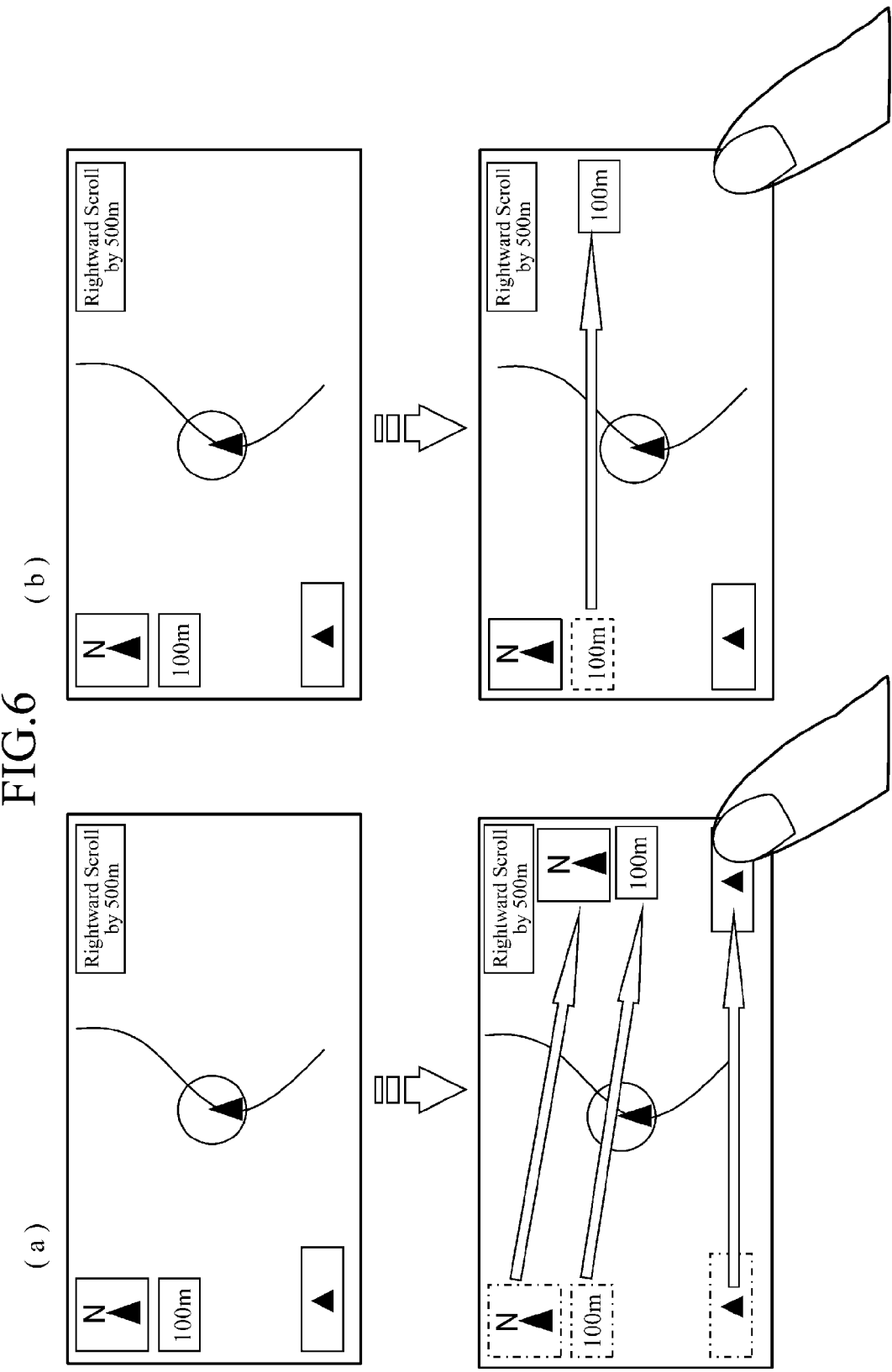
FIG. 6 is an operation conceptual diagram schematically showing the operation of the display input device in accordance with Embodiment 1 of the present invention on the touch panel.

An operation conceptual diagram schematically showing the operation of the display input device in accordance with Embodiment 1 of the present invention on the touch panel is shown in FIG. 6. In an example shown in FIG. 6(a), icons (icons showing the "compass bearing", the "scale", and the "heading" respectively) are gathered close to the finger position through the smoothly scrolling process as the finger approaches the touch panel are shown. In contrast, in an example shown in FIG. 6(b), the icon (the "scale" icon) is gathered close to the finger position through the smoothly scrolling process as the finger approaches the touch panel, whereas the icons (the "compass bearing" icon, etc.) are not gathered close to the finger position.

Furthermore, when an overlap occurs among the icon display positions of a plurality of icons through the process of moving and displaying the plurality of icons, the image information creating unit 303 needs to create an icon image in which the plurality of icons are rearranged in such a way that no overlap occurs among the plurality of icons under the control of the main control unit 300. At this time, the navigation CPU 30 (the overlap detecting unit 305) needs to detect an overlap occurring among the plurality of icons with reference to their icon attributes stored in the memory 32 to control the process of creating an image in which the plurality of icons are rearranged which is carried out by the image information creating unit 303. As a result, the visibility of the icons can be improved and hence operation mistakes can be prevented.

In addition, the navigation CPU 30 can carry out a process of enlarging the icons to display them according to the distance between the finger approaching the touch panel 1 and the touch panel 1. In this case, when the display of the icons is enlarged as the distance between the finger approaching the touch panel 1 and the touch panel 1 becomes short, operation mistakes resulting from unsteadiness, such as a vibration of the vehicle, can be prevented, and a further improvement can be provided in the operability, for example. In this embodiment, the display input device brings the icons close to the default position a immediately after making a transition from the process of step ST408 to that of step ST409. As an alternative, after a state in which the finger is far from the touch panel for a fixed period of time (e.g., about 0.5 seconds) continues, the display input device can move the icons to the default position. In this case, the operation feeling which the user has when accidentally moving his or her finger away from the touch panel becomes good.

Embodiment 2.

Figure 7:
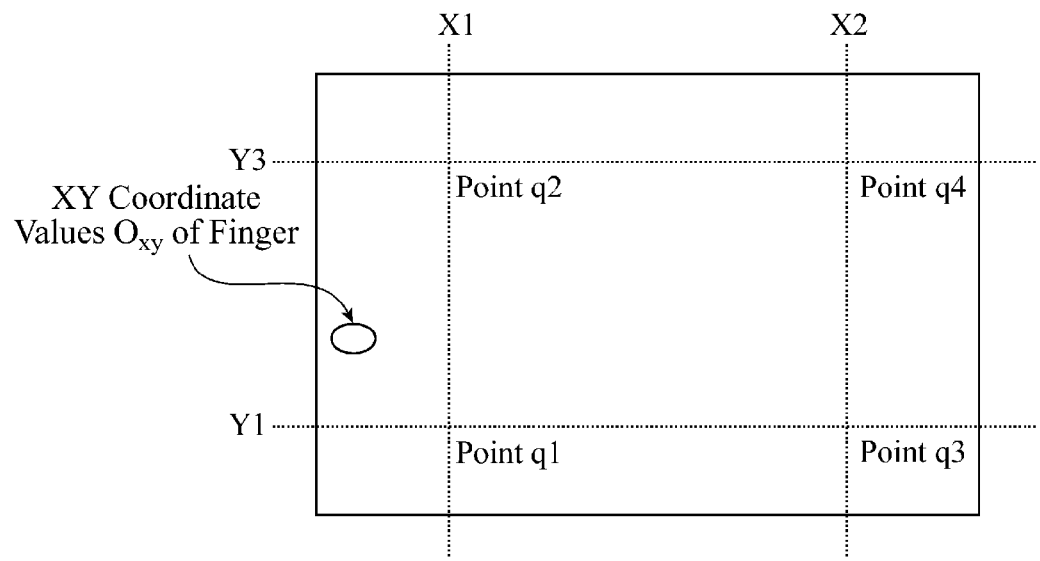
FIG. 7 is an operation conceptual diagram schematically showing the operation of a display input device in accordance with Embodiment 2 of the present invention on a touch panel.

FIG. 7 is an operation conceptual diagram showing the operation of a display input device in accordance with Embodiment 2 of the present invention on the screen of a touch panel.

The display input device in accordance with Embodiment 2 of the present invention uses the same structure as that of the display input device shown in FIG. 1, and also uses the same program structure as that of the navigation CPU 30 shown in FIG. 2, like that of above-mentioned Embodiment 1.

The display input device in accordance with Embodiment 1 which operates according to the flow chart shown in FIG. 4 moves icons displayed on the touch panel 1 to the position shown by the XY coordinate values $O_{xy}$ of a finger approaching the touch panel to display the icons at the position shown by the XY coordinate values. In contrast, the display input device in accordance with Embodiment 2, which will be explained hereafter, brings icons displayed on the touch panel 1 close to not the position shown by the XY coordinate values $O_{xy}$ of the finger, but a predetermined coordinate position on the touch panel 1.

More specifically, as shown in the operation conceptual diagram of FIG. 7, representative points $q1_{(x_1 y_1)}$ to $q4_{(x_2 y_3)}$ which are lattice points on the touch panel 1 are defined, and the display input device performs a control operation in such a way that the icons get close to the representative point $q1_{(x_1 y_1)}$ which is the closest to the XY coordinate values $O_{xy}$ of the finger. The display input device can implement this control operation by, when a navigation CPU 30 (an image information creating unit 303) creates image information including the icons, computing the difference between each of the plurality of pre-defined representative points and the XY coordinate values $O_{xy}$ of the finger, and writing the created image information including the icons placed at the representative point having the smallest difference in an image information storage area 322 of a memory 32.

In the display input device in accordance with above-mentioned Embodiment 2, when a finger's approach to within a predetermined distance from the touch panel is detected by proximity sensors 12, a control unit 3 (the navigation CPU30) moves at least one of the icons displayed on the touch panel 1 to a pre-defined position which is the closest to the stop position of the finger to display at least the icon at the pre-defined position. Therefore, in addition to the advantages provided by above-mentioned Embodiment 1, this Embodiment 2 offers an advantage of making it easy to create the software because the coordinates of the touch panel 1 to which the one or more icons are moved and displayed are fixed.

Furthermore, because a limited number of patterns in which the one or more icons are moved and gathered have only to be prepared according to the number of representative lattice points, a process of preventing an overlap among the one or more icons and so on can be eliminated.

Embodiment 3.

Figure 8:
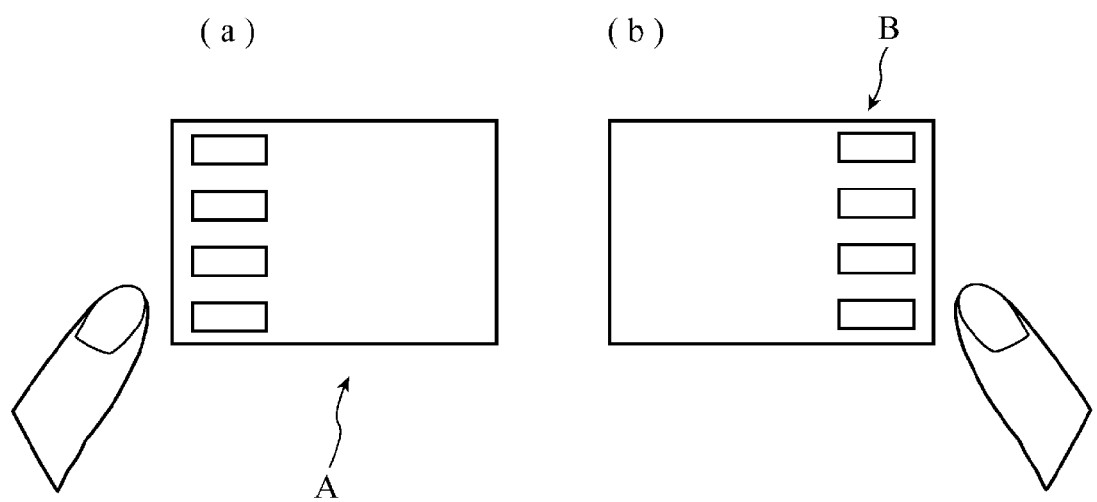
FIG. 8 is an operation conceptual diagram schematically showing the operation of a display input device in accordance with Embodiment 3 of the present invention on a touch panel.

FIG. 8 is an operation conceptual diagram showing the operation of a display input device in accordance with Embodiment 3 of the present invention on the screen of a touch panel.

The display input device in accordance with Embodiment 3 of the present invention uses the same structure as that of the display input device shown in FIG. 1, and also uses the same program structure as that of the navigation CPU 30 shown in FIG. 2, like that of above-mentioned Embodiment 1.

In the display input device in accordance with Embodiment 3, which will be explained hereafter, when the proximity sensors 12 detect that a finger is positioned in a left half of the touch panel 1 (when viewed from above), as shown in FIG. 8(a), a navigation CPU 30 moves an icon group close to the stop position of the finger according to a first pattern (A) in which the one or more icons according to their icon attributes are arranged to display the icon group in the vicinity of the position.

In contrast, when proximity sensors 12 detect that a finger is positioned in a right half of the touch panel 1 (when viewed from above), as shown in FIG. 8(b), the navigation CPU 30 moves the icon group close to the stop position of the finger according to a second pattern (B) in which the one or more icons according to their icon attributes are arranged to display the icon group in the vicinity of the position. Because the principles on which the movement and display is based are the same as those of Embodiment 1, the explanation of the principles will be omitted hereafter to avoid any duplicate explanation.

The display input device in accordance with above-mentioned Embodiment 3 of the present invention changes the arrangement of icons according to a pattern when a finger approaches the touch panel 1. For example, because a passenger on the front seat easily operates the display input device from a left side of the display input device when using the display input device mounted in a vehicle intended for Japan, when the user brings a finger close to the touch panel 1 from a left side of the touch panel, the display input device gathers the icon group in a left side area of the touch panel 1 to display the icon group, while when a passenger on the driver's seat brings a finger close to the touch panel 1 from a right side of the touch panel, the display input device gathers the icon group in a right side area of the touch panel 1 to display the icon group.

Therefore, the display input device can provide an icon arrangement suitable for an operation done by either a passenger on the front seat or a passenger on the driver's seat, thereby being able to provide an improvement in the user-friendliness for each passenger. In this case, the icon group gathered and arranged in the left or right side area of the touch panel can be implemented by storing a definition of each icon in advance in an icon attribute storage area 321 of a memory 32. For example, a "DVD play" icon is defined as an icon for a passenger on the front seat and a "route search" icon is defined as an icon for a passenger on the driver's seat.

Embodiment 4.

Figure 9:
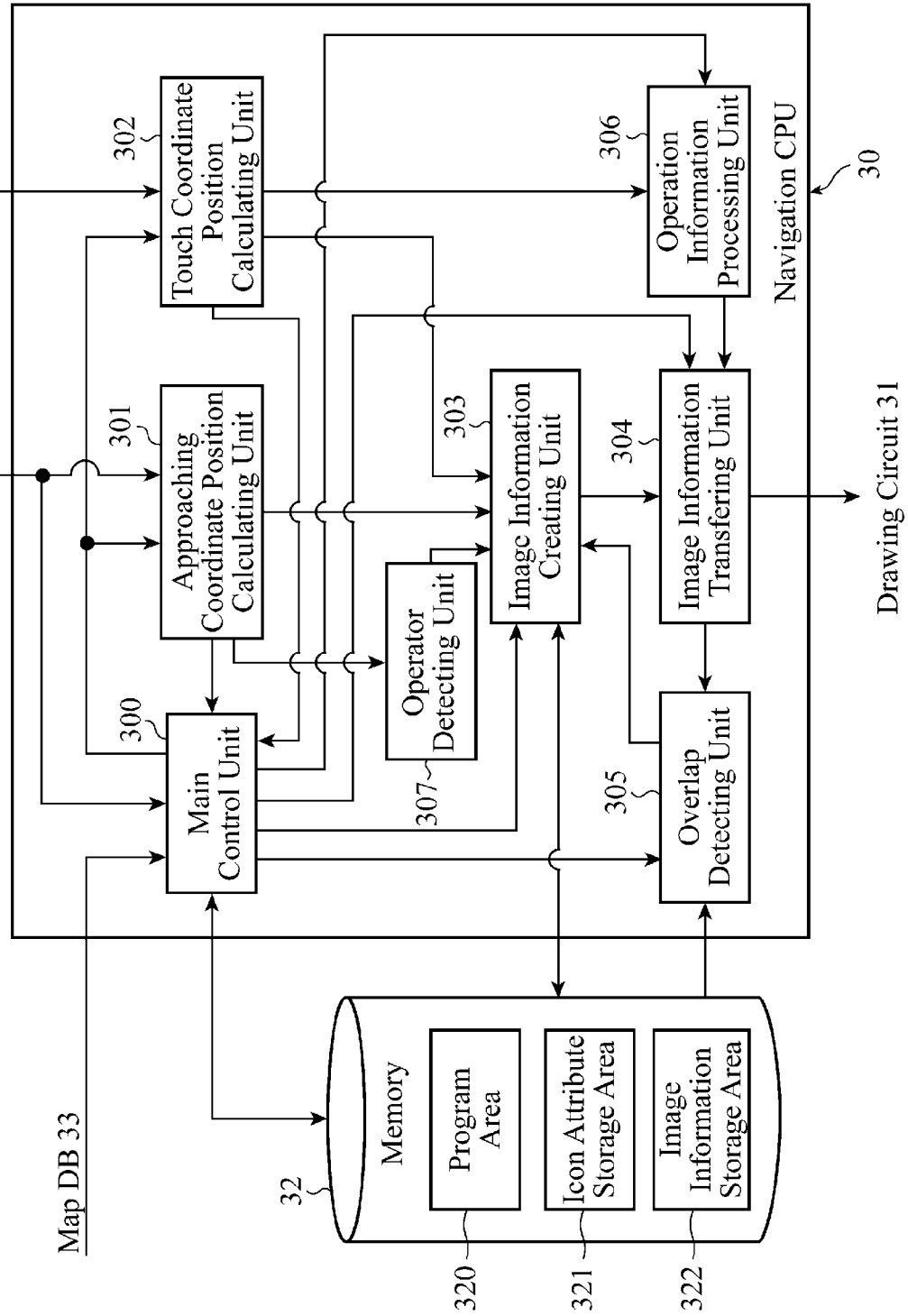
FIG. 9 is a block diagram showing a functional development of the program structure of a navigation CPU which a display input device in accordance with Embodiment 4 of the present invention has.

FIG. 9 is a block diagram showing a functional development of the structure of a program which a navigation CPU 30 of a display input device in accordance with Embodiment 4 of the present invention has.

As shown in FIG. 9, in the display input device in accordance with Embodiment 4 of the present invention, the navigation CPU 30 further includes an operator detecting unit 307 in addition to the structure of that in accordance with Embodiment 1 shown in FIG. 2. The operator detecting unit 307 has a function of detecting whether a finger which is positioned opposite to a touch panel 1 has approached the touch panel from either a direction of the driver's seat of a vehicle or a direction of the front seat of the vehicle. Concretely, the operator detecting unit 307 detects whether a finger has approached the touch panel from either the direction of the driver's seat of the vehicle or the direction of the front seat of the vehicle by calculating the coordinate position of the approaching object on the basis of a signal outputted by proximity sensors or by processing an image captured by a not-shown vehicle-mounted camera to control a process of creating a scroll image which is carried out by an image information creating unit 303.

For example, when the operator detecting unit determines that a finger has approached the touch panel from the direction of the driver's seat of the vehicle from the signal of the proximity sensors 12, a control unit 3 (the navigation CPU 30) moves a first pattern in which one or more icons suitable for operations done by a passenger on the driver's seat are arranged at a predetermined speed to display the first pattern moved. In contrast, when the operator detecting unit determines that a finger has approached the touch panel from the direction of the front seat of the vehicle from the signal of the proximity sensors 12, the control unit 3 moves a second pattern in which one or more icons suitable for operations done by a passenger on the front seat are arranged at a predetermined speed to display the second pattern moved. Because the principles on which the movement and display is based are the same as those of Embodiment 1, the explanation of the principles will be omitted hereafter to avoid any duplicate explanation.

FIG. 10 is an operation conceptual diagram showing the operation of the display input device in accordance with Embodiment 4 of the present invention on the touch panel.

FIG. 10(a) shows an icon group of icons which are arranged when a passenger on the driver's seat brings a finger close to the touch panel 1, and an icon group of icons which are arranged when a passenger on the front seat brings a finger close to the touch panel 1. The icon group corresponding to the above-mentioned first pattern is shown on a left side of the upper figure, and the icon group corresponding to the second pattern is shown on a right side of the upper figure. In this example, button icons of "DVD stop" and "DVD play" are displayed on a left side of the lower figure for operations to be done by a passenger on the front seat while button icons of "surrounding search" and "route change" are displayed on a right side of the lower figure for operations to be done by a passenger on the driver's seat, with a boundary between the left and right sides being an approximately center of the screen. As an alternatively, as shown in FIG. 10(b), icons which are to be moved and displayed are selectively displayed according to whether a finger has approached the touch panel from either the direction of the driver's seat of the vehicle or the direction of the front seat of the vehicle. In this case, in either of the case in which the operator detecting unit determines that a finger has approached the touch panel from the direction of the driver's seat from the signal of the proximity sensors 12 and the case in which the operator detecting unit determines that a finger has approached the touch panel from the direction of the front seat from the signal of the proximity sensor 12, the control unit 3 (the navigation CPU 30) selectively displays the icons which are to be moved close to the stop position of the finger by using the attributes shown by an icon attribute storage area 321 of a memory 32. In this embodiment, an example in which a passenger on the driver's seat selects a navigation menu to move this navigation menu close to the finger position to display the navigation menu in the vicinity of the position, and an example in which a passenger on the front seat selects an audio menu to move this audio menu close to the finger position to display the audio menu in the vicinity of the position are shown.

Therefore, in addition to the advantages provided by Embodiment 1, the above-mentioned display input device in accordance with Embodiment 4 of the present invention offers an advantage of, when applied to vehicle-mounted information equipment that carries out navigation and so on, making it possible to provide an icon arrangement suitable for operations to be done by a passenger on the front seat and an icon arrangement suitable for operations to be done by a passenger on the driver's seat, and another advantage of being able to provide a user interface excellent in flexibility and extendibility by enabling the user to select icons displayed in each of the icon arrangements, thereby being able to provide a further improvement in the operability and an improvement in the user-friendliness.

Embodiment 5.

A display input device in accordance with Embodiment 5 which will be explained hereafter is applied to a three-dimensional touch panel which can also measure the distance in the Z direction between its panel surface and a finger. More specifically, the touch panel 1 shown in FIG. 1 that can detect the position of an object in the X and Y directions is replaced by the three-dimensional touch panel that can also measure a distance in the Z direction. Because a technology of measuring a three-dimensional position is disclosed by patent reference 2, an explanation will be made assuming that this technology is simply applied to this embodiment. The display input device in accordance with Embodiment 5, which will be explained hereafter, varies and controls the moving display speed of icons according to the distance of an approaching finger.

Figure 11:
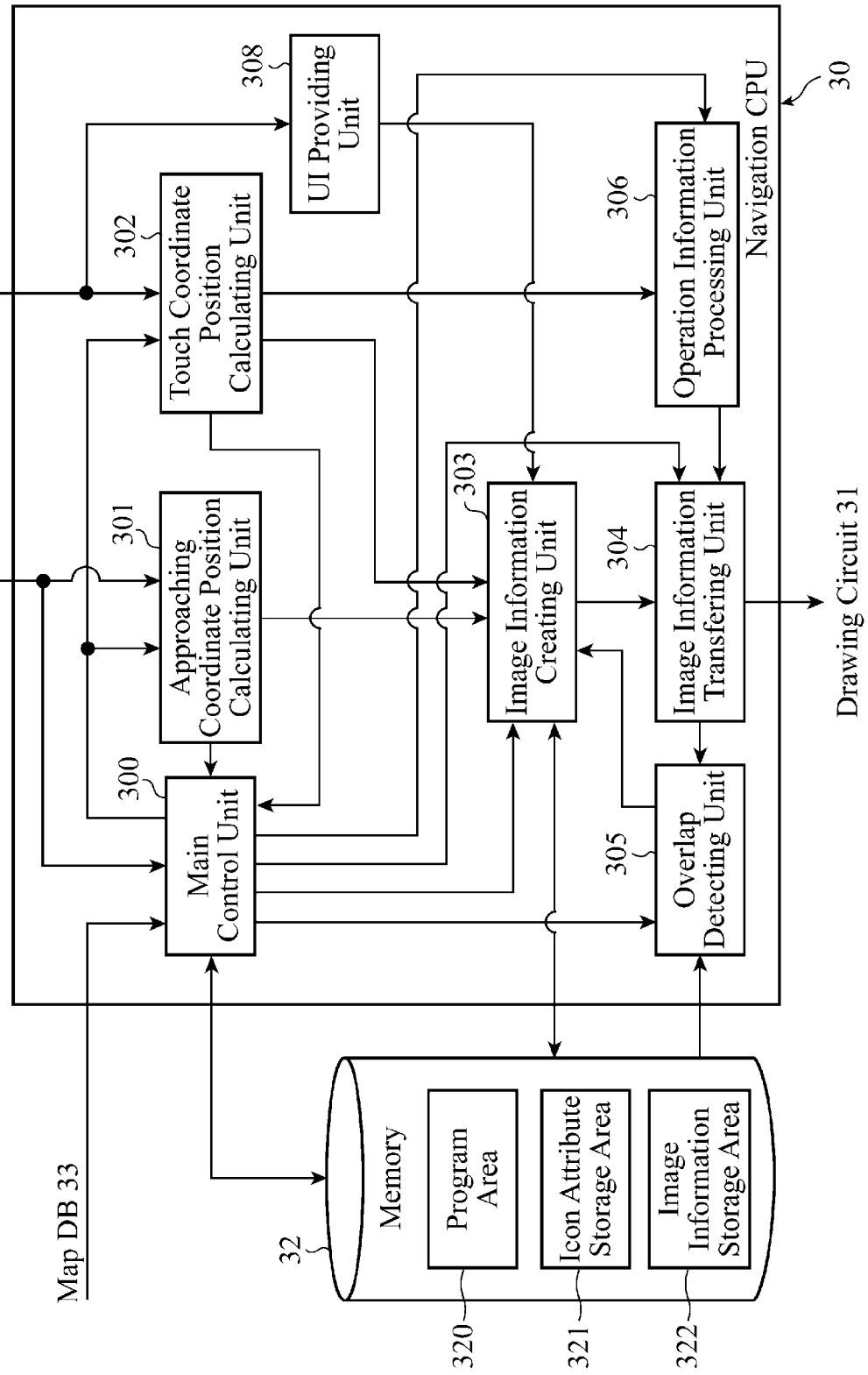
FIG. 11 is a block diagram showing a functional development of the program structure of a navigation CPU which a display input device in accordance with Embodiment 5 of the present invention has.

FIG. 11 is a block diagram showing a functional development of the structure of a program which a navigation CPU 30 of the display input device in accordance with Embodiment 5 of the present invention has.

As shown in FIG. 11, the navigation CPU 30 for use in the display input device in accordance with Embodiment 5 of the present invention includes an approaching coordinate position calculating unit 301 which is upgraded, from that of the navigation CPU 30 of the display input device in accordance with Embodiment 1 shown in FIG. 2, in such a way as to be able to carry out three-dimensional coordinate position calculations, and further includes a UI (User Interface) providing unit 308. The UI providing unit 308 has a function of providing a user interface which makes it possible for the user to make the display movement speed of icons, which is determined according to the distance in the Z direction between the touch panel 1 and the user's finger, variable according a setting inputted by the user via the three-dimensional touch panel. More specifically, the UI providing unit makes it possible for the user to make the display movement speed (scrolling speed) of icons variable by using a setting screen.

The above-mentioned display movement speed is not necessarily made variable according to the user setting. As an alternative, the icons can be moved close to the stop position of the finger at a speed determined according to the distance between the touch panel 1 and the finger which is detected by proximity sensors 12, so that the icons are displayed in the vicinity of the stop position. Furthermore, the display movement speed can be made variable according to the attributes of the icons defined in an icon attribute storage area 321 of a memory 32.

Figure 12:
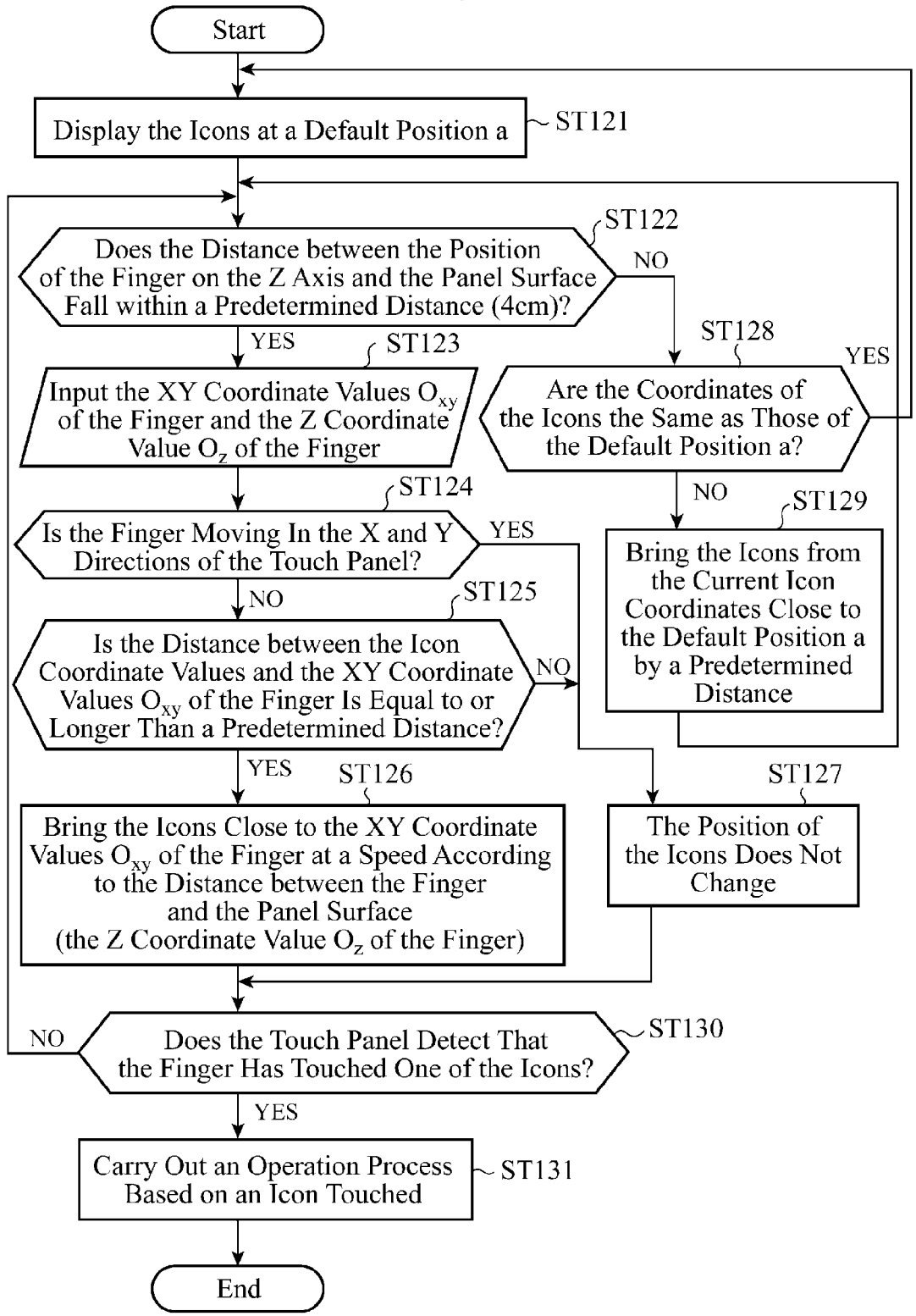
FIG. 12 is a flow chart showing the operation of the display input device in accordance with Embodiment 5 of the present invention.
Figure 13:
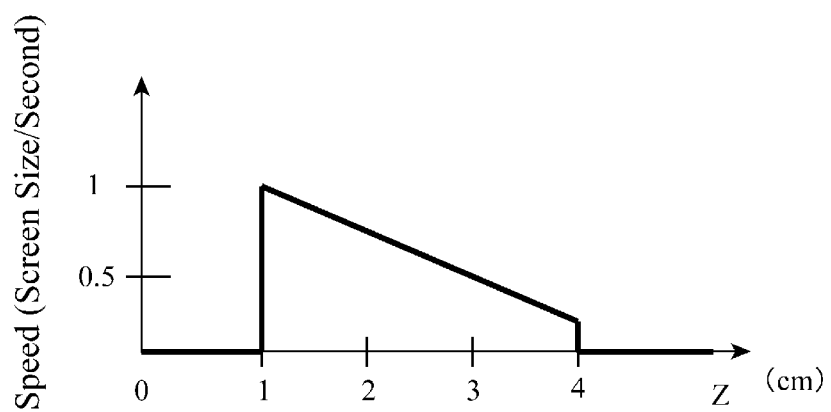
FIG. 13 is a figure showing the operation of the display input device in accordance with Embodiment 5 of the present invention in the form of a graph.

FIG. 12 is a flow chart showing the operation of the display input device in accordance with Embodiment 5 of the present invention, and FIG. 13 is a figure which is a graphical representation of a relationship between the distance between the touch panel 1 and a finger, and the movement speed of the icons.

An explanation will be made assuming that, as shown in the graph of FIG. 13, when a finger approaches to within a distance of 4 cm from the touch panel 1, the display input device smoothly scrolls the icons in such a way that they are gathered close to the position of the finger and displayed in the vicinity of the position of the finger, and the scrolling speed reaches its maximum when the distance between the finger and the touch panel is 1 cm and the icons do not move when the distance becomes shorter than 1 cm. Hereafter, the operation of the display input device in accordance with Embodiment 5 of the present invention will be explained in detail with reference to FIGS. 12 and 13.

It is assumed that an icon group is displayed at a default position a on the screen of the three-dimensional touch panel at first (step ST121).

When a user brings his or her finger close to the three-dimensional touch panel to operate the three-dimensional touch panel, the proximity sensors 12 detect this approach and transmits a signal to the navigation CPU 30, and a main control unit 300 of the navigation CPU 30 determines whether the distance between the position of the finger on the Z axis and the panel surface of the three-dimensional touch panel falls within a predetermined distance of 4 cm (step ST122).

When the main control unit detects that the distance between the position of the finger on the Z axis and the panel surface of the three-dimensional touch panel falls within the predetermined distance of 4 cm (if "YES" in step ST122), an approaching coordinate position calculating unit 301 calculates both the XY coordinate values $O_{xy}$ of the finger and the Z coordinate value $O_z$ of the finger, and outputs the XYZ coordinates $O_{xyz}$ of the finger to the main control unit 300 every 0.01 second only during 0.1 seconds, for example (step ST123).

The main control unit 300 can determine whether or not the finger is moving by receiving these coordinates continuously. More specifically, when there is no change in the XY coordinate values $O_{xy}$ of the finger during 0.1 seconds, the main control unit 300 determines that the finger is not moving in the X and Y directions of the touch panel 1 (if "NO" in step ST124), and further determines whether or not the distance between the icon display position and the XY coordinate values $O_{xy}$ of the finger is equal to or longer than a predetermined distance (step ST125). In this case, when the distance between the icon display position and the XY coordinate values $O_{xy}$ of the finger is equal to or longer than the predetermined distance (if "YES" in step ST125), the main control unit 300 starts a process of creating a scroll image which is carried out by an image information creating unit 303.

More specifically, the image information creating unit 303 creates image information (a scroll image) in such a way that the icon display position is placed close to the XY coordinate values $O_{xy}$ of the finger. This created image information is outputted to an image information transferring unit 304 while it is stored in an image information storage area 322 of a memory 32.

The image information transferring unit 304 receives the image information and transfers this image information to a drawing circuit 31, and a drawing control unit 310 of the drawing circuit 31 expands the image information transferred thereto, and a drawing unit 312 draws the expanded image information into a bitmap memory unit 313 at a high speed. A display control unit 314 then produces a desired display on the touch panel 1 (an LCD panel 10) according to the distance (the Z coordinate value $O_z$ of the finger) between the finger and the panel surface. More specifically, the display control unit 314 carries out a smoothly scrolling display process of bringing the icons close to the XY coordinate values $O_{xy}$ of the finger on the touch panel 1 (step ST126).

When it is determined in the process in step ST124 of determining whether or not the finger is moving in the X and Y directions that the finger is moving (if "YES" in step ST124), or when it is determined in the process in step ST125 of determining whether the distance between the icon display position and the XY coordinate values $O_{xy}$ of the finger is equal to or longer than the predetermined distance that the distance is neither equal to nor longer than the predetermined distance (if "NO" in step ST125), the display control unit determines that there is no change in the display position of the icons (step ST127).

When it is determined in step ST122 that the distance between the finger and the touch panel face falls within the predetermined range (if "YES" in step ST122), the main control unit 300 repeatedly carries out the above-mentioned processes of steps ST122 to ST127 until the touch panel 1 detects that the finger has touched one of the icons (if "YES" in step ST130). As a result, the icon group gets closer and closer to the XY coordinate values $O_{xy}$ of the finger on the three-dimensional touch panel at the movement speed according to the distance (the Z coordinate value $O_z$ of the finger) between the finger and the panel surface, so that the icon group is displayed in the vicinity of the XY coordinate values $O_{xy}$ of the finger.

When the three-dimensional touch panel detects that the finger has touched one of the icons (if "YES" in step ST130), a touch coordinate position calculating unit 302 calculates the coordinate position of the touch and hands over the control operation to an operation information processing unit 306. The operation information processing unit 306 then carries out an operation process based on an icon corresponding to the coordinates of the touch calculated by the touch coordinate position calculating unit (step ST131).

In contrast, when it is detected that the distance between the position on the Z axis of the finger and the panel surface is equal to or longer than 4 cm (if "NO" in step ST122), the main control unit 300 performs a comparison between the display position of the icons currently being displayed and the default coordinate position a (step ST128).

When determining that the display position of the icons currently being displayed differs from the default coordinate position a (if "NO" instep ST128), that it, when the icons have moved from the default position on the panel, the main control unit 300 controls the image information creating unit 303, and the image information creating unit 303 creates image information in such a way that the icons are brought close to the original display position a. This created image information created is then stored in the image information storage area 322 of the memory 32, and is further outputted to the image information transferring unit 304.

The image information transferring unit 304 receives the image information and transfers this image information to the drawing circuit 31, and the drawing control unit 310 of the drawing circuit 31 expands the image information transferred thereto, and the drawing unit 312 draws the expanded image information into the bitmap memory unit 313 at a high speed. The display control unit 314 produces a desired screen display on the three-dimensional touch panel. More specifically, the display control unit 314 produces a smoothly scrolling screen display on the three-dimensional touch panel at the movement speed according to the distance (the Z coordinate value $O_z$ of the finger) between the finger and the panel surface in such a way that the icons are brought close to the default position a from the current display position (step ST129).

When it is determined in step ST122 that the distance between the position on the Z axis of the finger and the panel surface is equal to or longer than 4 cm (if "NO" in step ST122), the main control unit 300 repeatedly carries out the processes of step ST128 and ST129 until the icons are returned to the default position a.

In the above-mentioned display input device in accordance with Embodiment 5 of the present invention, the control unit 3 (the navigation CPU 30) moves the icons close to the stop position of the finger at a speed according to the distance in the Z direction between the finger and the panel surface which is detected by the proximity sensors 12, and then displays the icons in the vicinity of the stop position of the finger. For example, when the distance in the Z axis reaches 4 cm, the icons start to be gradually (smoothly) gathered close to the stop position of the finger. After that, the control unit carries out the control operation to gradually increase the speed (the scrolling display speed) at which the icons are gathered as the distance in the Z axis varies from 4 cm to 1 cm, maximize the speed when the distance reaches 1 cm, and place the icons in a state in which they are at rest when the distance becomes shorter than 1 cm. As a result, the user-friendliness of the display input device is further improved.

The relationship between the distance in the Z direction and the movement speed (the scroll display speed) of the icons is limited to a linear numerical value as shown in a graph of FIG. 13. As an alternative, the relationship can be a curved line. Furthermore, the display movement speed can be made variable according to the icon attributes stored in the icon attribute storage area 321 of the memory 32, or can be made variable according to a setting made by a user. Because whether the display movement speed is made variable according to either the icon attributes or a setting made by a user can be selected arbitrarily, a flexible user interface can be provided.

Embodiment 6.

Figure 14:
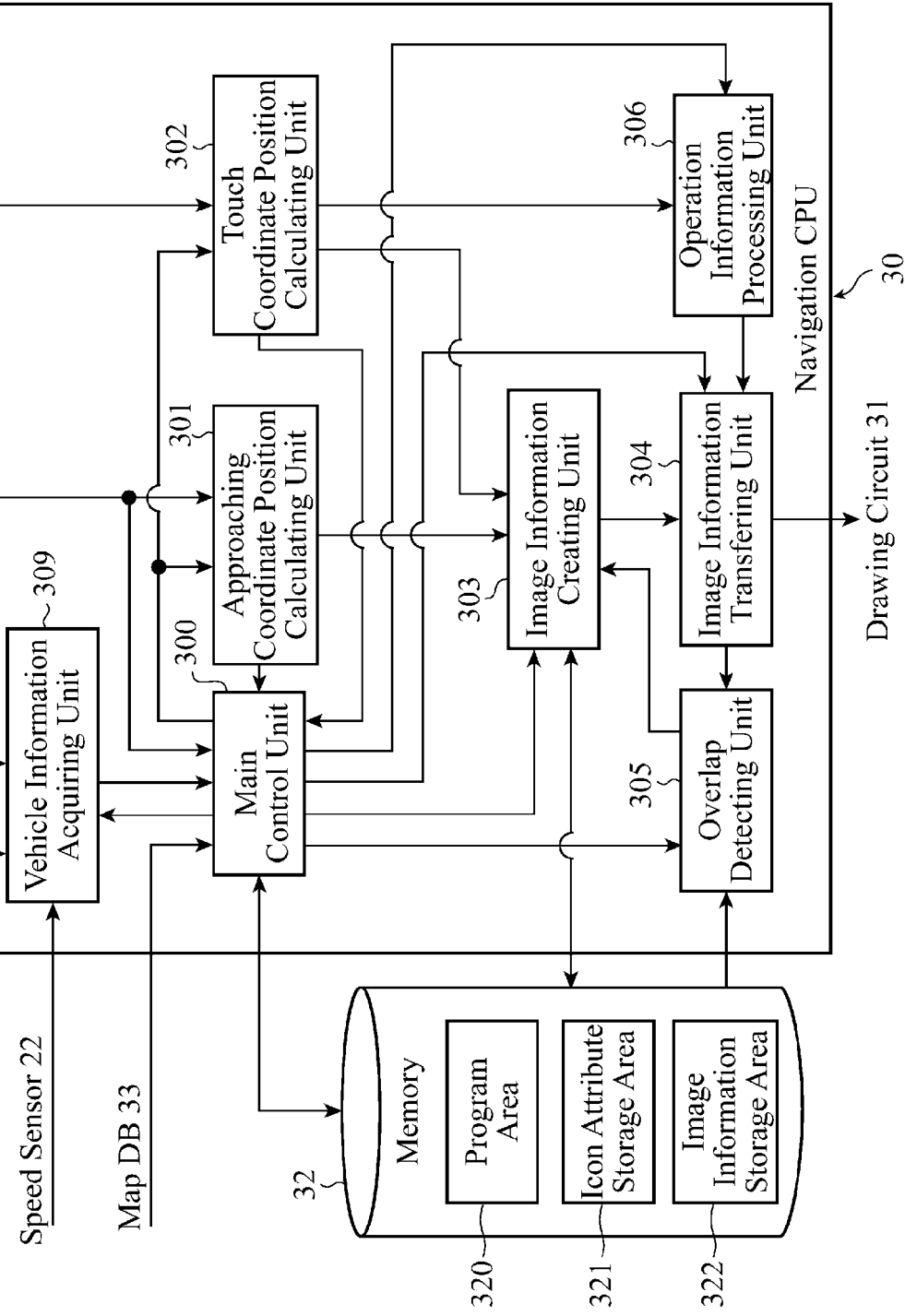
FIG. 14 is a block diagram showing a functional development of the program structure of a navigation CPU which a display input device in accordance with Embodiment 6 of the present invention has.

FIG. 14 is a block diagram showing a functional development of the structure of a program which a navigation CPU 30 of a display input device in accordance with Embodiment 6 of the present invention has.

As shown in FIG. 14, the navigation CPU 30 which the display input device in accordance with Embodiment 6 of the present invention has includes a vehicle information acquiring unit 309 in addition to the program structure which the navigation CPU in accordance with Embodiment 1 shown in FIG. 2 has. The vehicle information acquiring unit 309 has a function of measuring vehicle speed pulses outputted from a speed sensor 22 for detecting the running state of a vehicle, and informing the vehicle speed to a control unit 3 (the navigation CPU 30). At this time, when it is detected that the vehicle is running, the navigation CPU 30 moves an icon preset with a flag close to the stop position of a finger at a predetermined speed to display the icon in the vicinity of the stop position. Furthermore, when determining that the finger has approached from a front seat side of the vehicle by using proximity sensors 12, the navigation CPU 30 can move a preselected icon close to the stop position of the finger to display the preselected icon in the vicinity of the stop position.

FIG. 15 is an operation conceptual diagram showing the operation of the display input device in accordance with Embodiment 6 of the present invention on a touch panel 1.

As shown in FIG. 15, when a passenger on the driver's seat moves his or her finger close to the panel surface, a "compass bearing" icon, a "scale" icon, and a "surrounding search" button icon are moved and displayed in the vicinity of the stop position of the finger. At this time, a "video play" button icon is kept being displayed at a default position. By simply defining information showing that it is not preferable to move and display for the icon attribute of any icon which should not be moved and displayed (should not be brought close to the position of the finger) while the vehicle is running, and storing the information in an icon attribute storage area 321 of a memory 32, such an icon can be prevented from moving close to the position of the finger while the vehicle is running. When a passenger on the front seat operates the touch panel, the display input device can bring all icons close to the position of the finger to display them in the vicinity of the position of the finger. The icon attribute of any icon which should not be moved and displayed can be set arbitrarily.

In the above-mentioned display input device in accordance with Embodiment 6, when the speed sensor 22 detects that the vehicle is running, the control unit 3 moves a preselected icon close to the stop position of a finger at a predetermined speed to display the icon in the vicinity of the stop position. Therefore, in a case in which the display input device is used for vehicle-mounted equipment, the user-friendliness of the vehicle-mounted equipment can be improved. Furthermore, when the proximity sensors 12 determine that the finger has approached from a front seat side of the vehicle, the control unit 3 moves a preselected icon close to the stop position of the finger to display the icon in the vicinity of the stop position. As a result, because the display input device can restrict icons which a passenger on the driver's seat can use, the display input device can contribute to safe driving. Furthermore, because the display input device can arbitrarily form an arrangement of icons which are to be gathered when a passenger on the front seat brings his or her finger close to the touch panel, the user-friendliness can be further improved.

As previously explained, the display input device in accordance with any one of Embodiments 1 to 6 can respond to only an approach thereto of an object to be detected, such as a finger or a pen, to provide a new user interface in which a specific display object displayed on the screen, such as a icon, is moved close to the object to be detected according to a predetermined rule, and is displayed in the vicinity of the position of the object to be detected. Therefore, the operability can be further improved.

In the display input device in accordance with any one of Embodiments 1 to 6, although only icons are mentioned as the target for the movement and display, as previously explained, the target for the movement and display is not limited to icons. For example, specific information displayed in an arbitrary display area of the touch panel 1 can be the target for the movement and display. Furthermore, although only a finger is mentioned as an object to be detected, any object to be detected, such as a pen, other than a finger can also be detected by the display input device. In this case, the same advantages are provided.

The functions of the control unit 3 (the navigation CPU 30) shown in FIG. 2, 9, 11, or 14 can be all implemented via hardware, or at least a part of the functions can be implemented via software.

For example, the data process of, when the proximity sensors 12 detect an approach of an object to be detected to within a predetermined distance from the touch panel 1, moving at least one of pieces of information in one or more display areas each having a fixed range which are displayed on the touch panel 1 close to the stop position of the object to be detected to display the one or more pieces of information in the vicinity of the stop position can be implemented via one or more programs on a computer, at least a part of the data process can be implemented via hardware. In the above-mentioned embodiments, although the touch panel display that detects an approach of a finger and a touch of the finger on the touch panel is used, a touch panel display that detects a touch of a finger on the touch panel and a pushdown by the finger can be alternatively used, and the display input device can be constructed in such a way that, when the touch panel display is touched, bring an icon close to the touch position, and, when the touch panel display is pushed down, carry out a predetermined operation according to an icon at the pushdowned position. In this case, by using an operation method, such as a method of stopping the movement of the icon, when the finger is in contact with the touch panel at two points, the display input device can further improve the operation feeling. In this case, when the touch panel display is touched, the display input device can move the icon after a short lapse of time (e.g., after waiting for about 0.5 seconds).

Industrial Applicability

Because the display input device in accordance with the present invention can achieve a further improvement in operability, the display input device in accordance with the present invention is suitable for use in vehicle-mounted information equipment of a navigation system, and so on.

The invention claimed is:

1. A display input device comprising:
a touch panel that carries out a display of information and an input of information;
a proximity sensor that detects a movement of an object to be detected which is positioned opposite to said touch panel; and
a controller that, when said proximity sensor detects an approach of said object to be detected to within a predetermined distance from said touch panel, moves a specific display object displayed on said touch panel close to a stop position of said object to be detected to display said specific display object,
wherein said display object has attribution information showing that said movement is possible, and said controller moves the specific display object displayed on said touch panel close to the stop position of said object to be detected to display said specific display object with reference to said attribution information.

2. A display input device comprising:
a touch panel that carries out a display of information and an input of information;
a proximity sensor that detects a movement of an object to be detected which is positioned opposite to said touch panel; and
a controller that, when said proximity sensor detects an approach of said object to be detected to within a predetermined distance from said touch panel, moves a specific display object displayed on said touch panel close to a stop position of said object to be detected to display said specific display object,
wherein the stop position corresponds to a position of the object to be detected relative to the touch panel at such time as the object to be detected is detected as coming within the predetermined distance from the touch panel,
wherein when moving said display object close to the stop position of said object to be detected at a predetermined speed to display said display object, said controller rearranges and displays said display object in such a way that said display object does not overlap any other display object.

3. A display input device comprising:
a touch panel that carries out a display of information and an input of information;
a proximity sensor that detects a movement of an object to be detected which is positioned opposite to said touch panel; and
a controller that, when said proximity sensor detects an approach of said object to be detected to within a predetermined distance from said touch panel, moves a specific display object displayed on said touch panel close to a stop position of said object to be detected to display said specific display object,
wherein the stop position corresponds to a position of the object to be detected relative to the touch panel at such time as the object to be detected is detected as coming within the predetermined distance from the touch panel,
wherein said controller carries out a process of enlarging said display object to display said display object according to a distance between said object to be detected and said touch panel.

4. A display input device comprising:
a touch panel that carries out a display of information and an input of information;
a proximity sensor that detects a movement of an object to be detected which is positioned opposite to said touch panel; and
a controller that, when said proximity sensor detects an approach of said object to be detected to within a predetermined distance from said touch panel, moves a specific display object displayed on said touch panel close to a stop position of said object to be detected to display said specific display object,
wherein the stop position corresponds to a position of the object to be detected relative to the touch panel at such time as the object to be detected is detected as coming within the predetermined distance from the touch panel,
wherein said display object has attribution information showing that said movement is possible and said attribution information includes information specifying a display pattern of said display object, and when said proximity sensor detects that said object to be detected is positioned in a left half of said touch panel, said controller moves said display object close to the stop position of said object to be detected to display said display object according to said attribution information and on a basis of a first pattern, whereas when said proximity sensor detects that said object to be detected is positioned in a right half of said touch panel, said controller moves said display object close to the stop position of said object to be detected to display said display object according to said attribution information and on a basis of a second pattern.

5. A display input device comprising:
a touch panel that carries out a display of information and an input of information;

a proximity sensor that detects a movement of an object to be detected which is positioned opposite to said touch panel; and a controller that, when said proximity sensor detects an approach of said object to be detected to within a predetermined distance from said touch panel, moves a specific display object displayed on said touch panel close to a stop position of said object to be detected to display said specific display object, wherein the stop position corresponds to a position of the object to be detected relative to the touch panel at such time as the object to be detected is detected as coming within the predetermined distance from the touch panel, wherein said display object has attribution information showing that said movement is possible, said display input device has an operator detector that detects whether either a driver or a passenger on a front seat operates said display input device, and said attribution information includes information specifying a display pattern of said display object, and wherein when said operator detector determines that said driver operates said display input device, said controller displays said display object according to a display pattern suitable for operations by said passenger on a driver's seat, whereas when said operator detector determines that said passenger on the front seat operates said display input device, said controller displays said display object according to a display pattern suitable for operations by said passenger on the front seat.

6. The display input device according to claim 5, wherein when said operator detector determines that said driver operates said display input device and when said operator detector determines that said passenger on the front seat operates said display input device, said controller selects said display object which is to be moved close to the stop position of said object to be detected according to the attribute shown by said attribution information.

7. A display input device comprising:
a touch panel that carries out a display of information and an input of information;
a proximity sensor that detects a movement of an object to be detected which is positioned opposite to said touch panel; and
a controller that, when said proximity sensor detects an approach of said object to be detected to within a predetermined distance from said touch panel, moves a specific display object displayed on said touch panel close to a stop position of said object to be detected to display said specific display object,
wherein said controller moves said display object close to the stop position of said object to be detected according to a speed dependent upon a distance between said touch panel and said object to be detected which is detected by said proximity sensor to display said display object.

8. The display input device according to claim 7, wherein said controller changes the speed at which said controller moves said display object to display said display object according to the attribution information about said display object.

9. The display input device according to claim 7, wherein said controller changes the speed at which said controller moves said display object to display said display object, the speed being determined according to the distance between said touch panel and said object to be detected, according to a user setting inputted via said touch panel.

10. A display input device comprising:
a touch panel that carries out a display of information and an input of information;
a proximity sensor that detects a movement of an object to be detected which is positioned opposite to said touch panel; and
a controller that, when said proximity sensor detects an approach of said object to be detected to within a predetermined distance from said touch panel, moves a specific display object displayed on said touch panel close to a stop position of said object to be detected to display said specific display object,
wherein the stop position corresponds to a position of the object to be detected relative to the touch panel at such time as the object to be detected is detected as coming within the predetermined distance from the touch panel,
wherein said display input device has a speed sensor that detects a running state of a vehicle, and when said speed sensor detects that said vehicle is running, said controller moves said display object which is preselected close to the stop position of said object to be detected at a predetermined speed to display said display object.

11. The display input device according to claim 10, wherein said proximity sensor detects whether said object to be detected approaches said touch panel from either a direction of a driver's seat of the vehicle or a direction of a front seat of the vehicle, and when said proximity sensor determines that said object to be detected approaches said touch panel from the direction of said front seat of the vehicle, said controller moves said display object which is preselected close to the stop position of said object to be detected to display said display object.

\* \* \* \* \*